(12) United States Patent
Andersson et al.

(10) Patent No.: US 12,166,381 B2
(45) Date of Patent: Dec. 10, 2024

(54) STATOR COOLING FOR ELECTRIC MACHINES

(71) Applicant: Volvo Car Corporation, Gothenburg (SE)

(72) Inventors: Johan Andersson, Gothenburg (SE); Johan Brunberg, Mölndal (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/494,900

(22) Filed: Oct. 6, 2021

(65) Prior Publication Data

US 2022/0209594 A1 Jun. 30, 2022

Related U.S. Application Data

(60) Provisional application No. 63/131,991, filed on Dec. 30, 2020.

(51) Int. Cl.
*H02K 1/20* (2006.01)
*H02K 5/20* (2006.01)

(52) U.S. Cl.
CPC .............. *H02K 1/20* (2013.01); *H02K 5/203* (2021.01)

(58) Field of Classification Search
CPC .................................. H02K 1/20; H02K 5/203
See application file for complete search history.

(56) References Cited

U.S. PATENT DOCUMENTS

| 4,520,679 A | * | 6/1985 | Hatamura | ............. | G01L 5/1627 |
| | | | | | 73/862.15 |
| 2016/0164377 A1 | | 6/2016 | Gauthier et al. | | |
| 2017/0353089 A1 | * | 12/2017 | Nies | ....................... | H02K 1/146 |

(Continued)

FOREIGN PATENT DOCUMENTS

| CN | 101877505 A | 11/2010 |
| CN | 103633761 A | 3/2014 |

(Continued)

OTHER PUBLICATIONS

Jerin (WO 2018087017 A1) English Translation (Year: 2018).*

(Continued)

*Primary Examiner* — Tulsidas C Patel
*Assistant Examiner* — Robert E Mates
(74) *Attorney, Agent, or Firm* — Amin, Turocy & Watson, LLP

(57) ABSTRACT

A stator can comprise a stator body comprising an inner cooling duct, and an outer cooling duct, wherein the inner cooling duct is located closer to a center axis of the stator body than the outer cooling duct, a first endplate received at a first end of the stator body, the first endplate comprising an inlet jacket circumferentially located within the first endplate, an inlet finger fluidly connected to the inlet jacket, and a drainage jacket circumferentially located within the first endplate, a second endplate received at a second end of the stator body, the second endplate comprising an outlet jacket circumstantially located within the second endplate, and an outlet finger fluidly connected to the outlet jacket, wherein the inner cooling duct fluidly connects the inlet jacket to the outlet finger, and wherein the outer cooling duct fluidly connects to the outlet jacket to the drainage jacket.

20 Claims, 21 Drawing Sheets

(56) References Cited

U.S. PATENT DOCUMENTS

| | | |
|---|---|---|
| 2018/0013326 A1 | 1/2018 | Mongeau |
| 2018/0054094 A1 | 2/2018 | Dlala et al. |
| 2019/0123612 A1* | 4/2019 | Weber ..................... H02K 1/20 |
| 2019/0186622 A1* | 6/2019 | Ishikawa ................ H02K 7/083 |
| 2019/0207439 A1* | 7/2019 | Marino .................... H02K 1/20 |
| 2019/0273420 A1* | 9/2019 | Yasuda ................... H02K 1/20 |

FOREIGN PATENT DOCUMENTS

| | | | | |
|---|---|---|---|---|
| CN | 104704723 | A | 6/2015 | |
| CN | 104838567 | A | 8/2015 | |
| CN | 207475301 | U | 6/2018 | |
| CN | 110999042 | A | 4/2020 | |
| DE | 102011012454 | A1 * | 8/2012 | ............ H02K 16/04 |
| DE | 10-2016-222331 | A1 | 5/2018 | |
| EP | 2463991 | A2 * | 6/2012 | ............... H02K 1/20 |
| WO | WO-2018087017 | A1 * | 5/2018 | |
| WO | 2019017786 | A1 | 1/2019 | |

OTHER PUBLICATIONS

Malischweski (DE 102011012454 A1) English Translation (Year: 2012).*

Koehring (EP 2463991 A2) English Translation (Year: 2012).*

Extended European Search Report received for European Patent Application Serial No. 21217873.5 dated May 25, 2022, 10 pages.

Office Action received for Chinese Patent Application Serial No. 202111646278.2 dated May 25, 2023, 9 pages (Original Copy Only).

Notification of grant of patent right for invention for CN application No. 202111646278 dated Nov. 3, 2023.

* cited by examiner

STATOR COOLING FOR ELECTRIC MACHINES

CROSS-REFERENCE TO RELATED APPLICATIONS

This application claims the benefit of and priority to U.S. Provisional Application No. 63/131,991, filed Dec. 30, 2020, entitled "STATOR COOLING FOR ELECTRIC MACHINES." The entirety of the aforementioned application is hereby incorporated herein by reference.

TECHNICAL FIELD

The present description generally relates to cooling of electric motor stators and more specifically to semi-closed circuit stator cooling for electric machines.

BACKGROUND

Electric vehicles (EVs) are becoming increasingly popular as compared their internal combustion engine (ICE) powered counterparts. EVs promise increased efficiencies and reduced greenhouse gas emissions over gasoline, diesel, hybrid, or natural-gas powered vehicles. EVs typically comprise fewer moving parts and are becoming increasingly reliable. However, like ICEs, electric motors also need to be cooled. Cooling an electric motor can lower resistance within an electric motor, and by lowering resistance, less current needs to be applied to achieve a given torque.

Existing stator cooling systems are often inefficient and can experience drag loss. Water-based cooling systems can be dangerous due to the risk of an electrical short or shock (e.g., if water leakage or seepage occurs). Oil-based cooling systems can be safer due to a lack of electrical conductivity, but existing systems introduce oil directly on a stator back or onto copper windings, which can increase drag and reduce efficiency due to the high-velocity nature of electric rotor rotation.

The above-described background relating to stator cooling is merely intended to provide a contextual overview of some current issues and is not intended to be exhaustive. Other contextual information may become further apparent upon review of the following detailed description.

SUMMARY

The following summary is a general overview of various embodiments disclosed herein and is not intended to be exhaustive of limiting upon the disclosed embodiments. Embodiments are better understood upon consideration of the detailed description below in conjunction with the accompanying drawings and claims.

It is an object of the present description to provide for an improved stator cooling system.

In one embodiment, a stator is described herein. The stator can comprise a stator body comprising an inner cooling duct, and an outer cooling duct, wherein the inner cooling duct is located closer to a center axis of the stator body than the outer cooling duct, a first endplate received at a first end of the stator body, the first endplate comprising an inlet jacket circumferentially located within the first endplate, an inlet finger fluidly connected to the inlet jacket, and a drainage jacket circumferentially located within the first endplate, a second endplate received at a second end of the stator body, the second endplate comprising an outlet jacket circumstantially located within the second endplate, and an outlet finger fluidly connected to the outlet jacket, wherein the inner cooling duct fluidly connects the inlet jacket to the outlet finger, and wherein the outer cooling duct fluidly connects to the outlet jacket to the drainage jacket.

In another embodiment, a stator assembly is described herein. The stator assembly can comprise a stator body, wherein the stator body comprises, an array of inner cooling ducts circumferentially located around the stator body and fluidly connecting a first end of the stator body to a second end of the stator body, an array of outer cooling ducts circumferentially located around the stator body and fluidly connecting the second end of the of the stator body to the first end of the stator body, wherein the array of outer cooling ducts is located closer to an outer surface of the stator body than the array of inner cooling ducts, a first stator endplate located at a first end of the stator body, wherein the first stator endplate comprises an inlet jacket circumferentially located at the first end of the stator body, and an array of inlet fingers fluidly connected the inlet jacket and fluidly connected to the array of inner cooling ducts, and a second stator endplate located at a second end of the stator body, wherein the second stator endplate comprises an outlet jacket circumferentially located at the second end of the stator body, and an array of outlet fingers fluidly connected to a drainage jacket and fluidly connected to the array of outer cooling ducts.

In a further embodiment, a method for cooling a stator is described herein. The method can comprise directing coolant from a coolant reservoir to a coolant inlet at a first end of the stator, directing coolant from the coolant inlet to an inlet jacket circumferentially located at the first end of the stator, directing coolant from the inlet jacket to an inlet finger, directing coolant from the inlet finger to an inner cooling duct spanning from the first end of the stator to a second end of the stator, directing coolant from the inner cooling duct to an outlet finger, directing coolant from the outlet finger to an outlet jacket circumferentially located at the second end of the stator, directing coolant from the outlet jacket to an outer cooling duct spanning from the second end of the stator to a first end of the stator, directing coolant from the outer cooling duct to a drainage jacket circumferentially located at the first end of the stator, and directing coolant from the drainage jacket to an oil drain at the first end of the stator.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

As used herein, the term "up" or "upper" is used to indicate a position or direction, it is intended to mean towards the roof of a vehicle during normal use of the vehicle. Additionally, the term "forward" is used to indicate a relatively frontal position or direction with respect to a vehicle. Likewise, "rear" is used to indicate a relatively rearward position or direction with respect to a vehicle.

FIGS. 1-20 illustrate an exemplary stator 102 (e.g., a stator assembly) in accordance with various embodiments described herein. In this regard, stator 102 is illustrated in various states of construction/deconstruction in order to illustrate its plurality of features, components, and/or sub-components. Therefore, it should be appreciated that some features, components, and/or subcomponents may not be visible in some figures, but this does not preclude inclusion of such omitted features, components, and/or subcomponents since such an omission may only be for visualization purposes.

Figure 1:
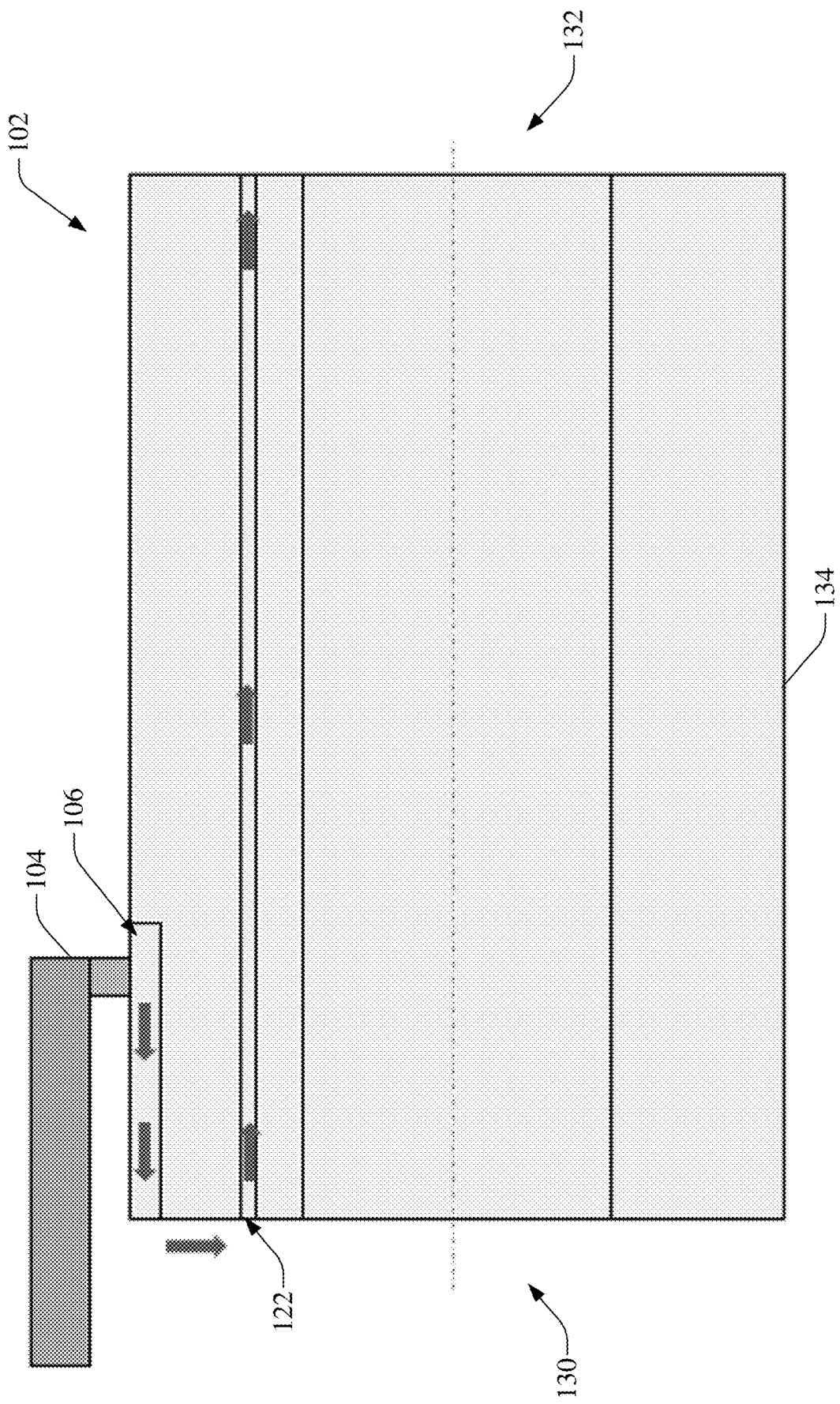
FIG. 1 illustrates a section-view of an exemplary stator in accordance with one or more embodiments described herein.

Turning now to FIG. 1, there is illustrated an oil/coolant supply 104. It is noted that oil supply 104 can comprise a reservoir which can supply a variety of cooling liquids or gases. Many embodiments herein utilize oil-based liquids. Other embodiments can utilize water or gas-based coolants. According to an embodiment, the oil supply 104 can be fluidly connected to an output from a transmission oiling or oil cooling system (not pictured) to which an electric motor (not pictured) comprising the stator 102 is coupled. In this regard, a stator 102 can share an oil supply and be fluidly connected with a vehicle transmission oiling or oil cooling system. In this regard, the stator 102 can be cooled with transmission fluid. In various embodiments, oil supply 104 can comprise an oil or coolant reservoir. In further embodiments, stator 102 can comprise a dedicated (e.g., not shared) oil supply 104. Oil can be supplied from an oil supply 104 into an oil cavity 106 of the stator 102. According to an embodiment, the oil cavity 106 can comprise a chamber or a depression in the stator body 134. According to an embodiment, an oil pump (not pictured) can generate oil pressure to move oil throughout the stator 102. Further, the oil drain 116 can be fluidly connected to an oil inlet of a transmission oiling or cooling system, or another suitable system.

It is noted that stator 102 can comprise one or more of a variety of materials, such as steel, aluminum, various alloys, plastics, composites, or other materials suitable for construction of a stator. According to an embodiment, the stator 102 can comprise a plurality of layers of laminate material, and various jackets, channels, ducts, or other features of the stator 102 can be formed in said laminate layers. In this regard, said layers of laminate material can be joined, for instance, using an adhesive such as an epoxy. Various jackets, channels, ducts, or other features can be formed in the laminate material or drilled after formation of the stator 102. The foregoing can enable leak-free flow of fluid (e.g., oil, transmission fluid, water, coolant, or another suitable fluid) through the stator for cooling without permitting said fluid to contact copper windings 142 of a stator or of a rotor (not depicted). This can reduce drag between a stator herein and/or a rotor, thus improving efficiency, and additionally can prevent a fluid herein from carrying an electrical charge (e.g., when water is used as a coolant), thus improving safety.

Figure 2:
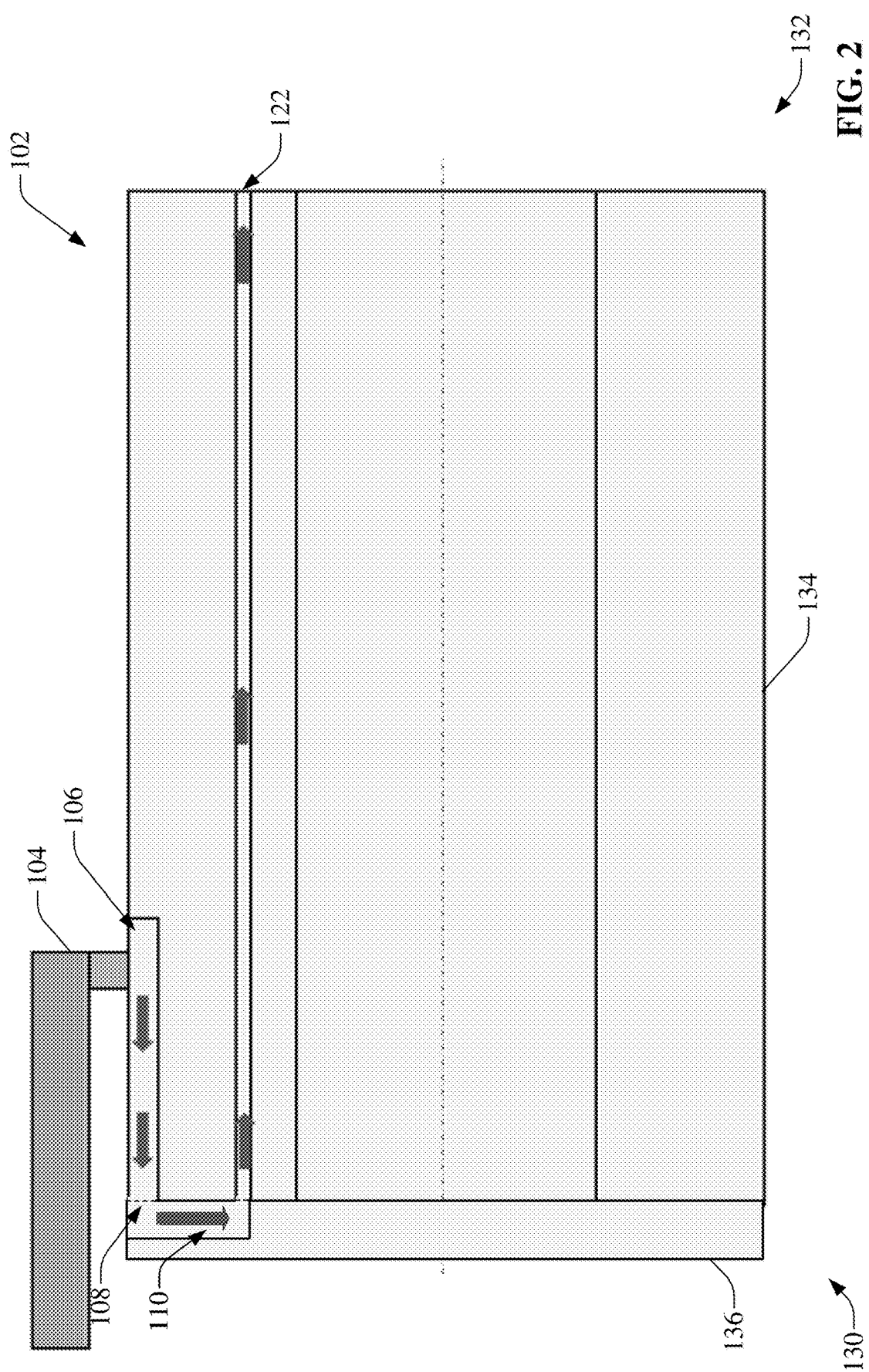
FIG. 2 illustrates a section-view of an exemplary stator in accordance with one or more embodiments described herein.

FIG. 2 additionally illustrates an endplate 136 as later discussed in greater detail. It is noted that the endplate 136 can comprise an oil inlet 108 fluidly connected to an oil cavity 106 and/or an inlet jacket 110 fluidly connected to an inner cooling duct 122 of a stator body 134.

Figure 3:
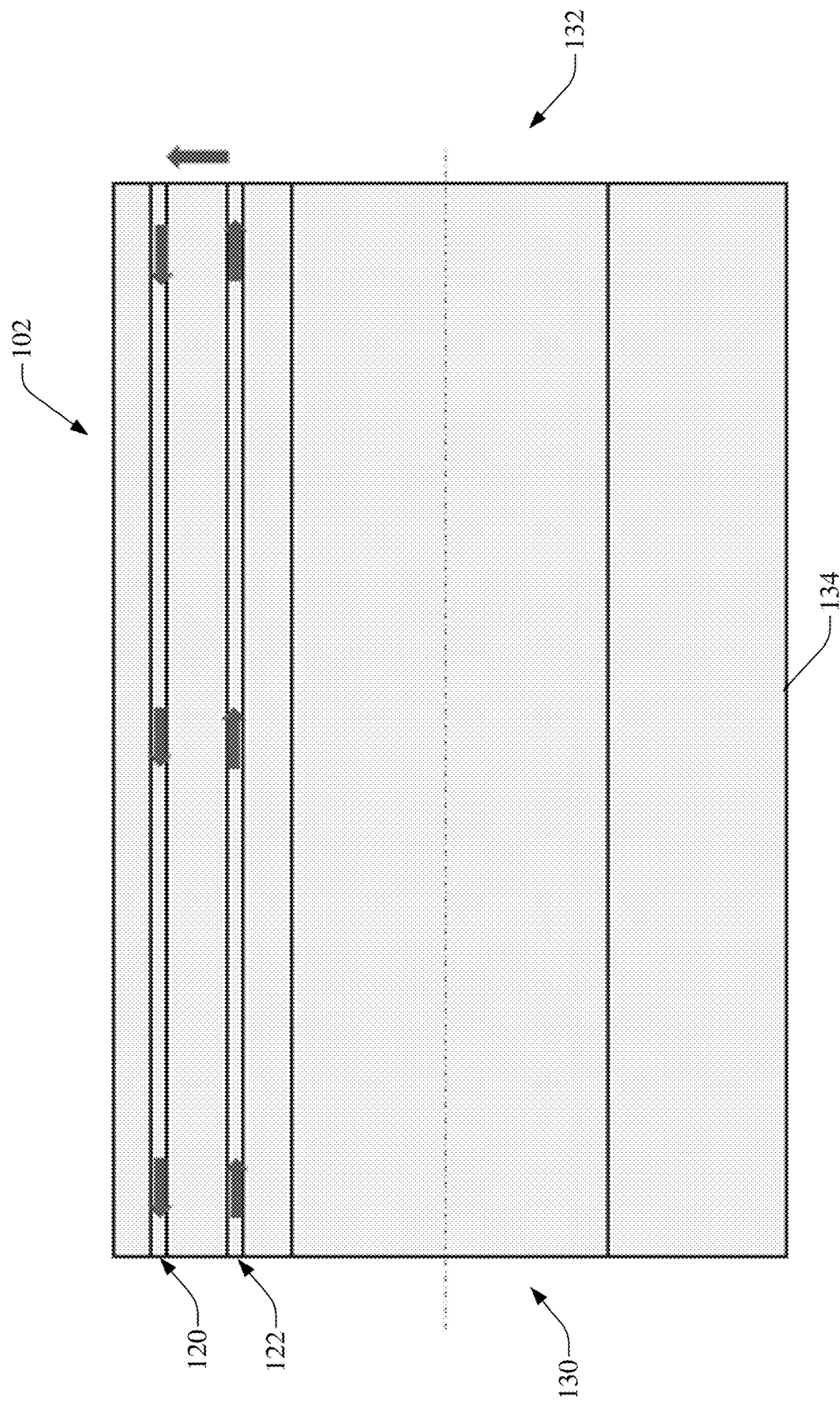
FIG. 3 illustrates a section-view of an exemplary stator in accordance with one or more embodiments described herein.

Turning now to FIG. 3, there is additionally illustrated an outer cooling duct 120 and an inner cooling duct 122. It is noted that inner cooling duct 122 can, for instance, carry oil from a first end (e.g., a non-driving-end 130) to a second end (e.g., a driving-end 132). Similarly, an outer cooling duct 120 can carry oil from a driving-end 132 to a non-driving-end 130. In other embodiments, the opposite can occur (e.g., inner cooling duct 122 can carry oil from a driving-end 132 to a non-driving-end 130 and an outer cooling duct 120 can carry oil from a non-driving-end 130 to a driving-end 132). It is noted that a center section of a stator 102 can comprise a stator body 134. It is further noted that a driving-end 132 of a stator 102 can comprise an output shaft of an electric motor and/or be coupled to a transmission.

Figure 4:
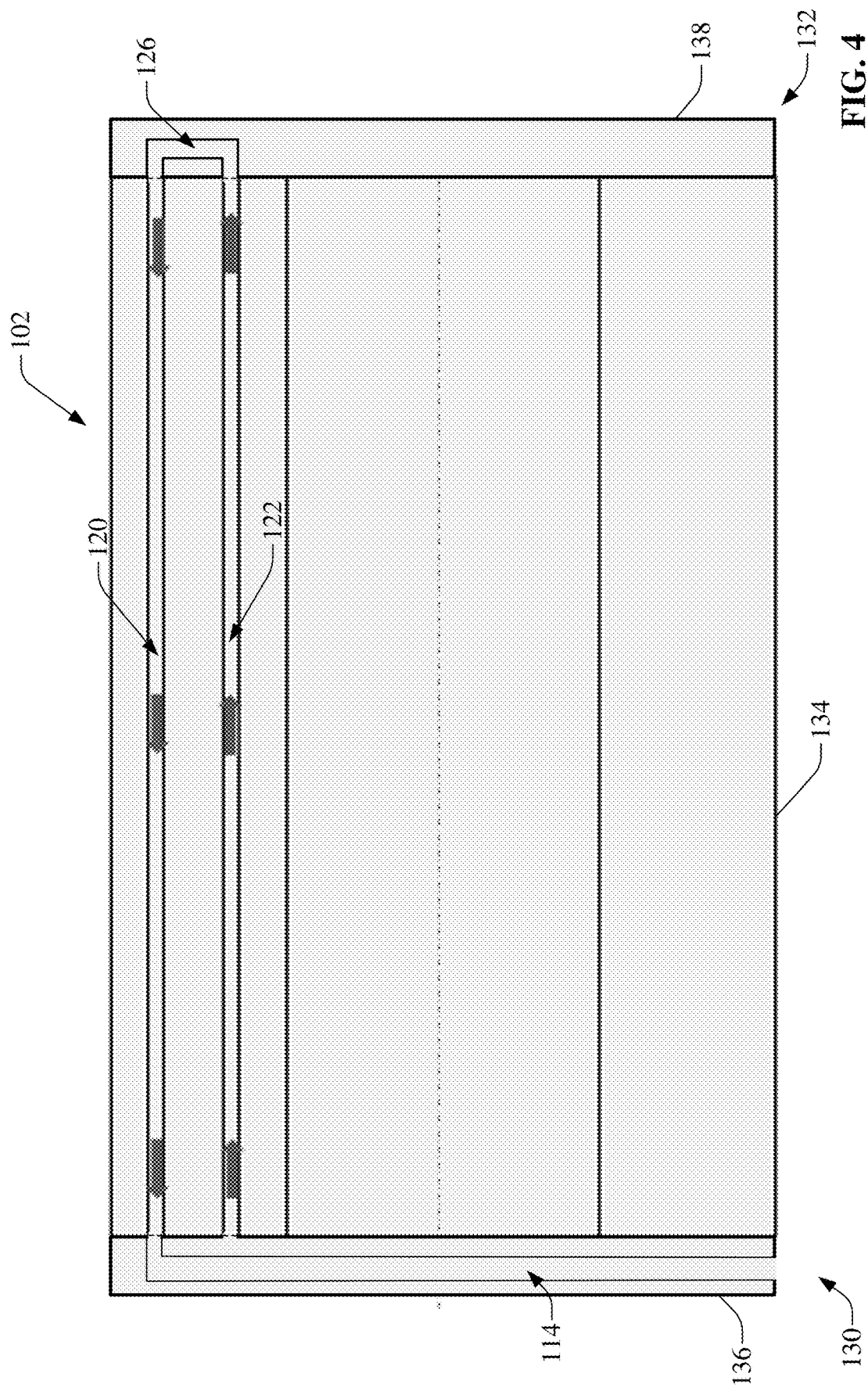
FIG. 4 illustrates a section-view of an exemplary stator in accordance with one or more embodiments described herein.
Figure 5:
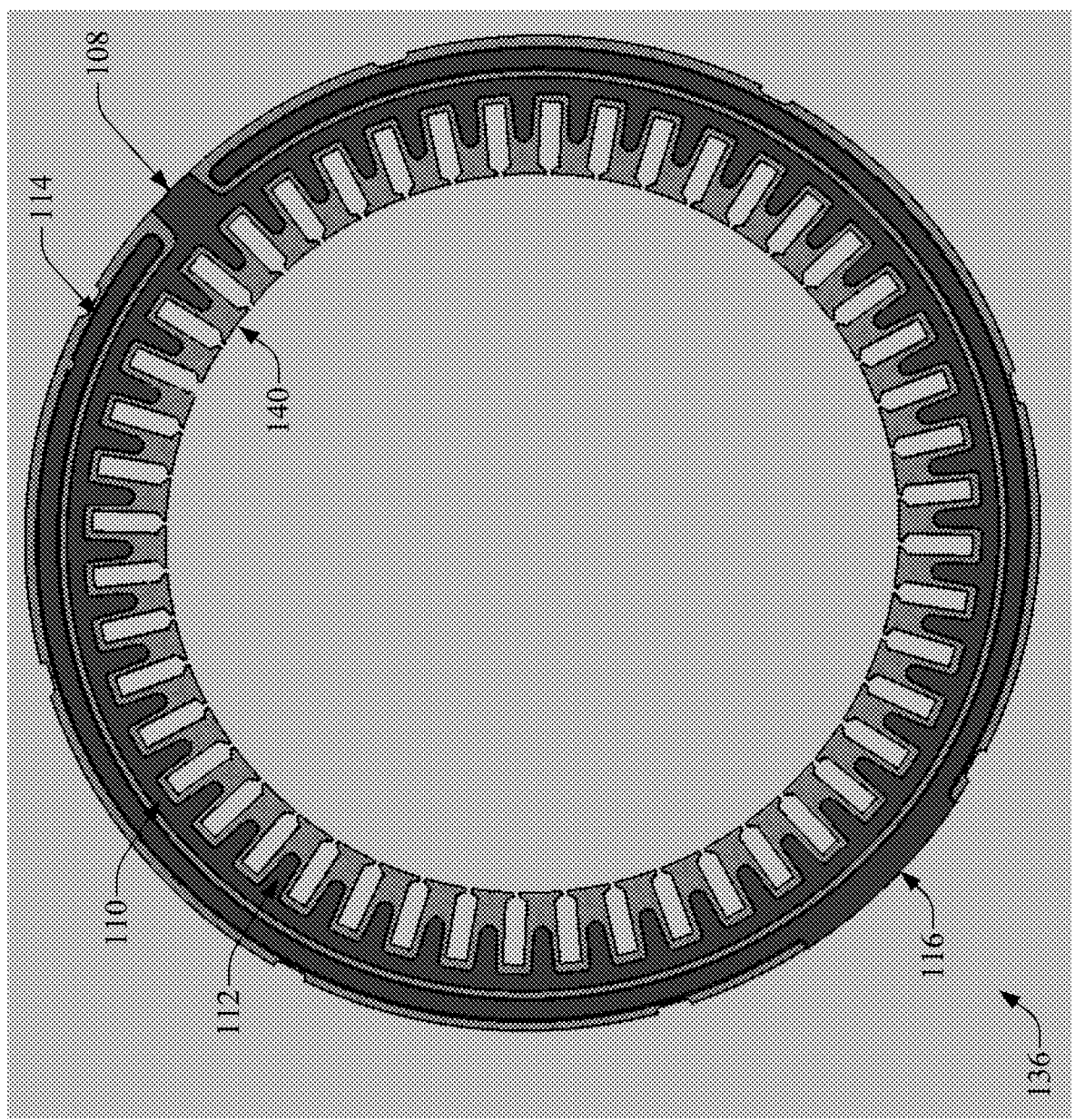
FIG. 5 illustrates an exemplary endplate of a stator assembly in accordance with one or more embodiments described herein.
Figure 6:
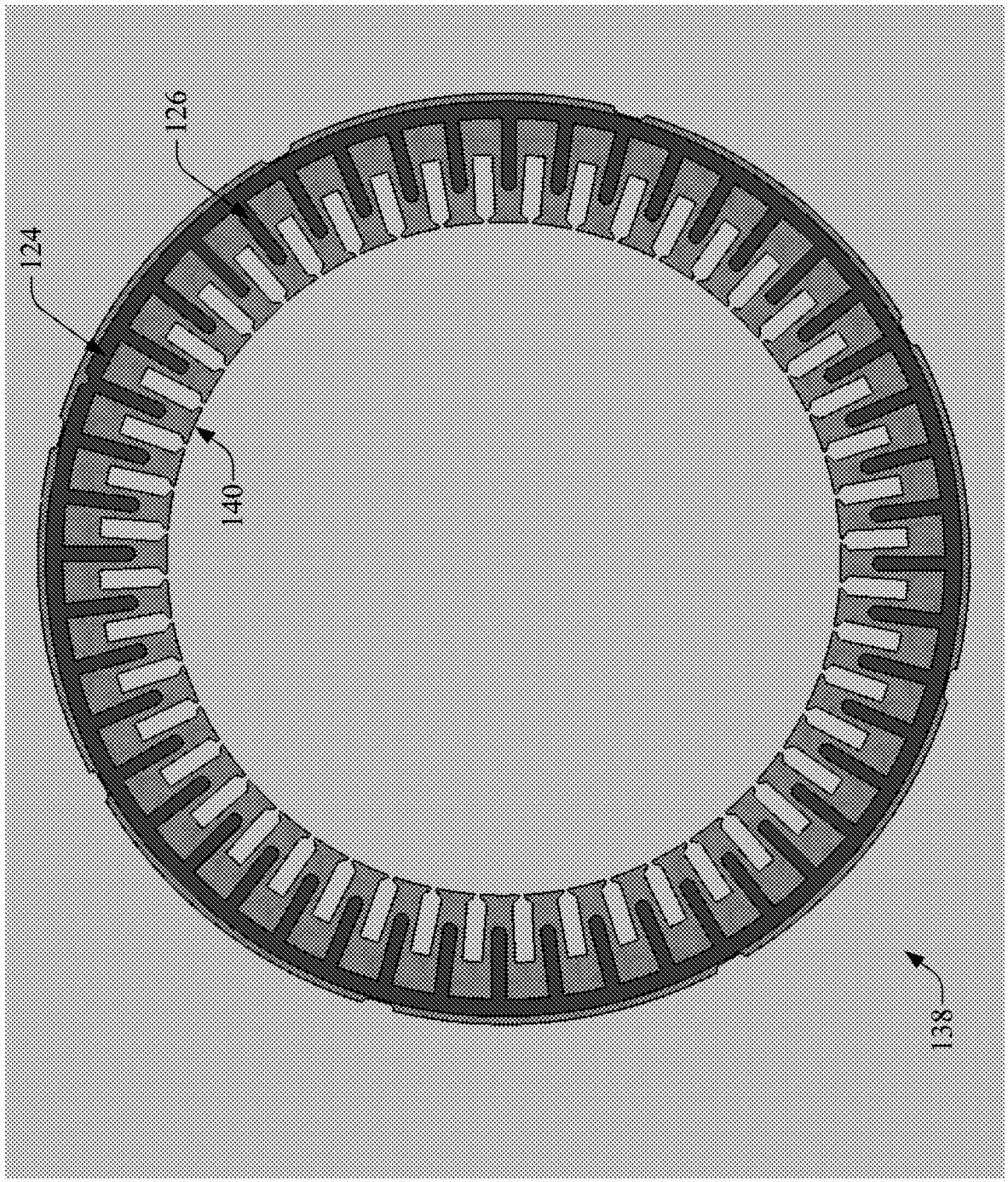
FIG. 6 illustrates an exemplary endplate of a stator assembly in accordance with one or more embodiments described herein.

FIG. 4 additionally illustrates endplates 136 and 138. It is noted that the endplate 136 can comprise a drainage jacket 114 fluidly connected to outer ducts 120 of the stator body 134. The endplate 136 can comprise outlet fingers 126 fluidly connected to the inner ducts 122 and outer ducts 120 (see, e.g., FIGS. 6 and 16).

Figure 7:
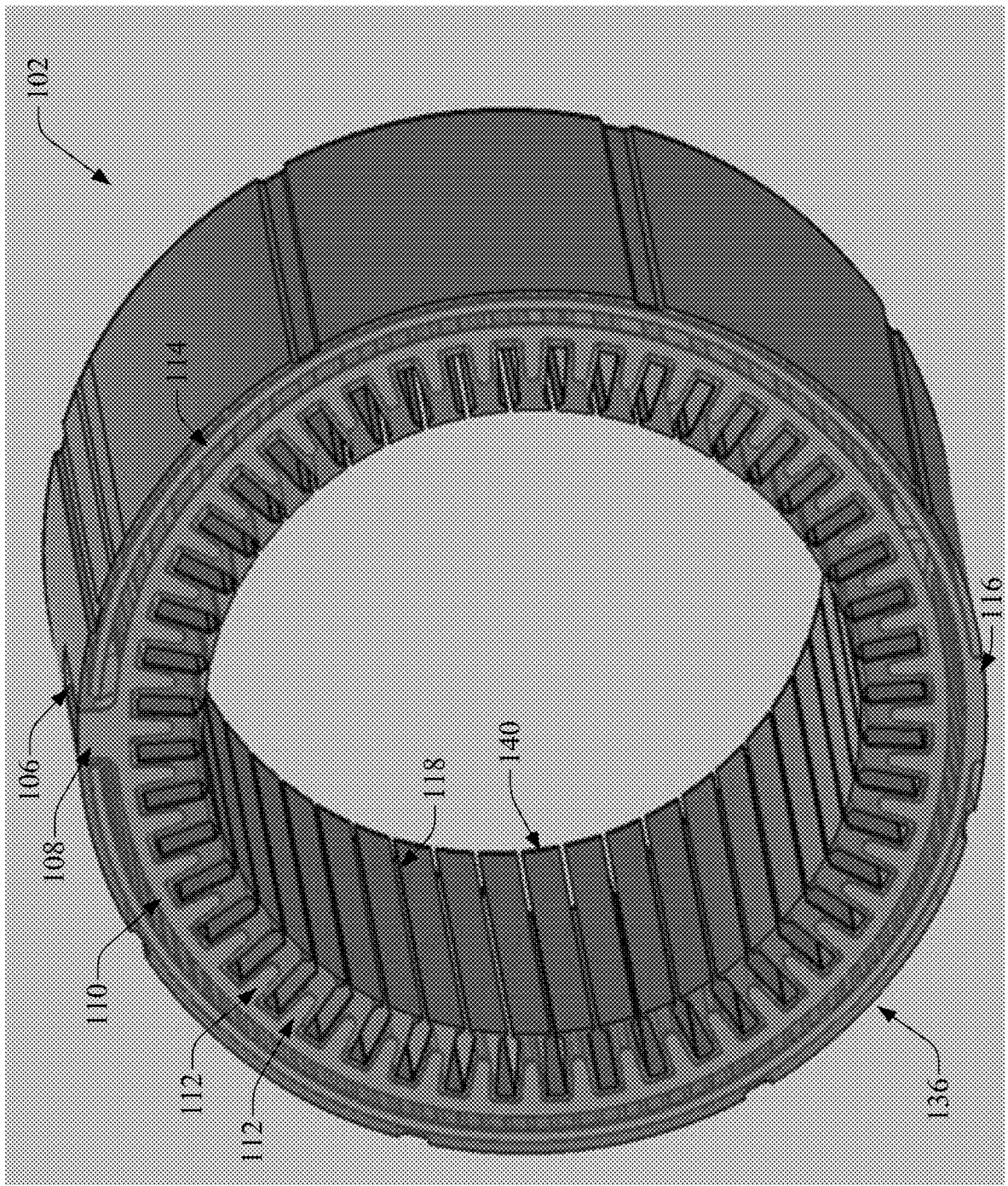
FIG. 7 illustrates a perspective-view of an exemplary stator in accordance with one or more embodiments described herein.
Figure 16:
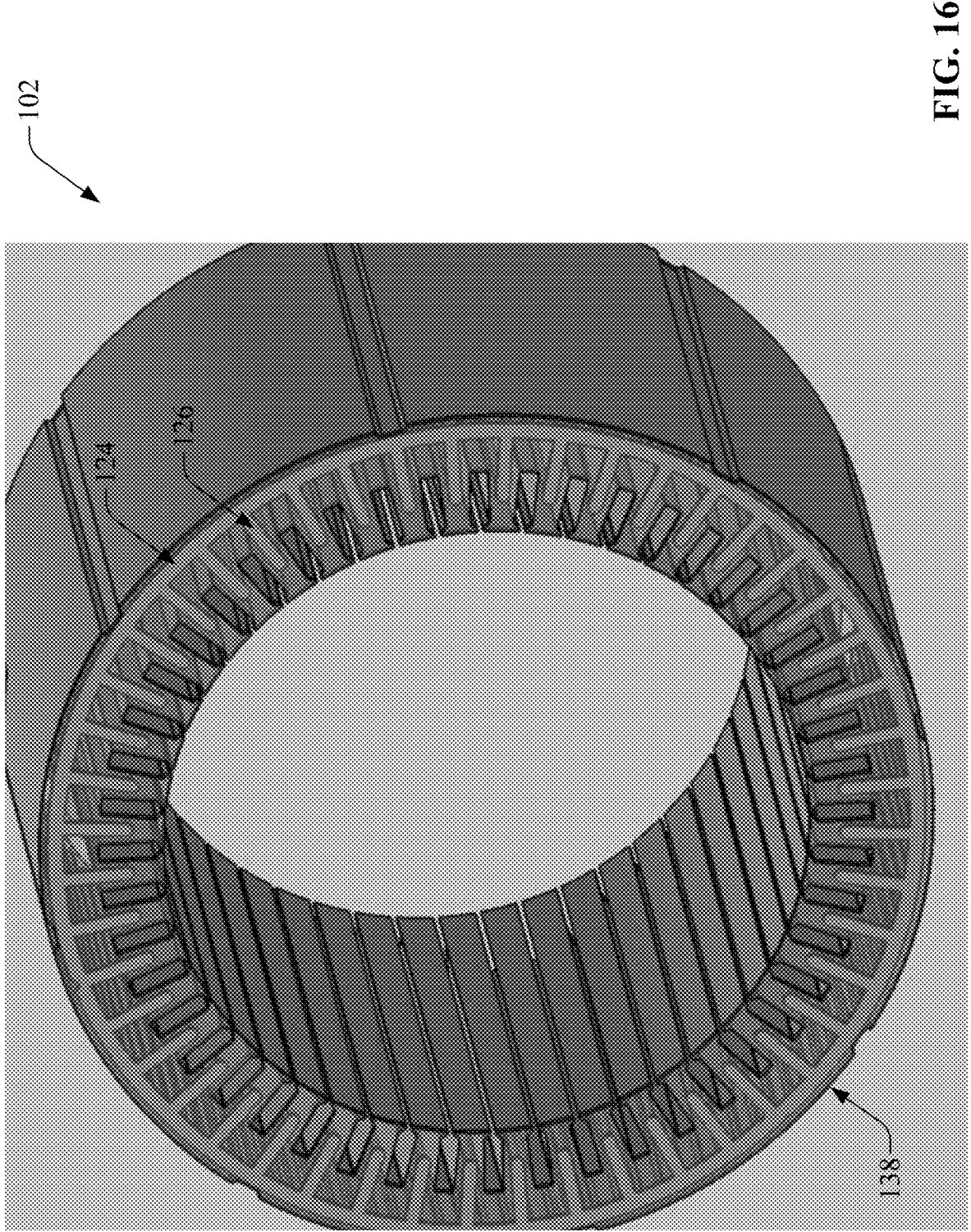
FIG. 16 illustrates a perspective-view of an exemplary stator in accordance with one or more embodiments described herein.

In various embodiments, the non-driving-end 130 and the driving-end 132 and can each comprise an endplate (e.g., endplate 136 located at a non-driving-end and/or endplate 138 located at a driving-end-see, e.g., FIGS. 7 and 16 which illustrate a transparent view of the endplate 136 and endplate 138, respectively). It is noted that the endplate 136 can represent a first endplate, and the endplate 138 can represent a second endplate. According to an embodiment, each endplate can be stamped, and can be removably attached to the stator body 134. In this regard, each of the endplates 136 or 138 can be secured to the stator body 134 with screws, bolts, washers, nuts, studs, clips, or other suitable fasteners. In other embodiments, the endplates 136 and 138 can be permanently affixed to the stator body 134. It is noted that endplates 136 and 138 can comprise one or more of a variety of materials, such as steel, aluminum, various alloys, plastics, composites, or other materials suitable for construction of a stator endplate. In this regard, one or more of said variety of materials can be stamped to form the endplates 136 and 138. In other embodiments, endplates 136 and/or endplate 138 can be made from laminate layers of material joined with an adhesive (e.g., an epoxy). According to an example, each endplate can be approximately 2mm thick. In various embodiments, endplates 136 and/or 138 can comprise geometries of the oil inlet 108, inlet jacket 110, inlet fingers 112, drainage jacket 114, inner ducts 122, outer ducts 120, outlet jacket 124, outlet fingers 126, and/or oil drain 116. In additional/alternative embodiments, the stator body 134 can comprise the oil inlet 108, inlet jacket 110, inlet fingers 112, drainage jacket 114, inner ducts 122, outer ducts 120, outlet jacket 124, outlet fingers 126, and/or oil drain 116. In further embodiments, both of the stator body 134 and endplates can comprise oil inlet 108, inlet jacket 110, inlet fingers 112, drainage jacket 114, inner ducts 122, outer ducts 120, outlet jacket 124, outlet fingers 126, and/or oil drain 116, each sharing a portion a respective geometry of the above components.

With reference to FIG. 7, there is illustrated an oil cavity 106, oil inlet 108, inlet jacket 110, array of inlet fingers 112, drainage jacket 114, oil drain 116, winding cavities 118, and stator teeth 140. It is noted that FIG. 7 illustrates a non-driving-end 130 (e.g., a first end) of a stator 102. According to an embodiment, oil can flow from an oil cavity 106 to an oil inlet 108. The oil inlet 108 can comprise a hollow slot into the inlet jacket 110. The inlet jacket 110 can comprise a hollow ring concentric with the stator. Oil can flow from the oil inlet 108 into the inlet jacket 110. Inlet jacket 110 can be fluidly coupled to an array of inlet fingers 112. Inlet fingers 112 can extend inward, toward a center axis of the stator 102. It is noted that the inlet fingers can be received in stator teeth (e.g., an array of stator tooth 140) of a stator body, endplate 136, and/or endplate 138. In this regard, the inlet fingers 112 can reach very closely to copper windings (e.g., copper winding 142 in FIG. 8) of the stator located in winding cavities 118. According to an embodiment, said copper windings of the stator can be received between each inlet finger 112 of an array of inlet fingers 112. It is further noted that said copper windings of the stator can be received between fingers of the array of inlet fingers 112 and fingers of the array of outlet fingers 126. This can enable highly efficient cooling of said windings without introducing oil onto other electric motor components (e.g., a rotor). For instance, copper temperatures can be lowered by approximately 15-20% in Worldwide harmonized Light-duty vehicles Test Cycles (WLTC). By lowering copper temperatures by 15-20%, cycle efficiency can be improved by approximately 1% which can yield significant energy savings over an extended period of time. Further, the outer cooling ducts 120 can remove heat closer to an exterior surface of the stator 102.

Figure 8:
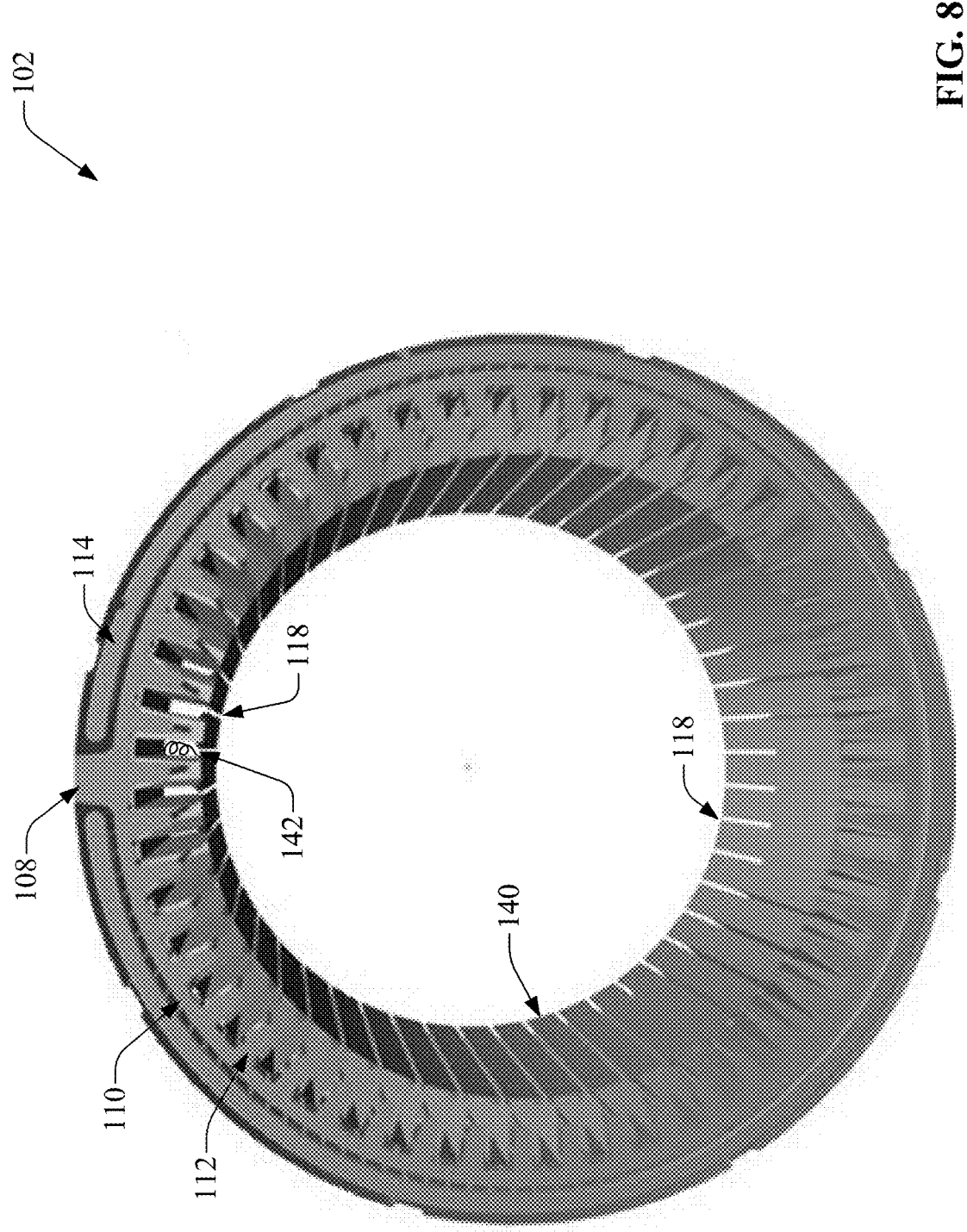
FIG. 8 illustrates a perspective-view of an exemplary stator in accordance with one or more embodiments described herein.
Figure 9:
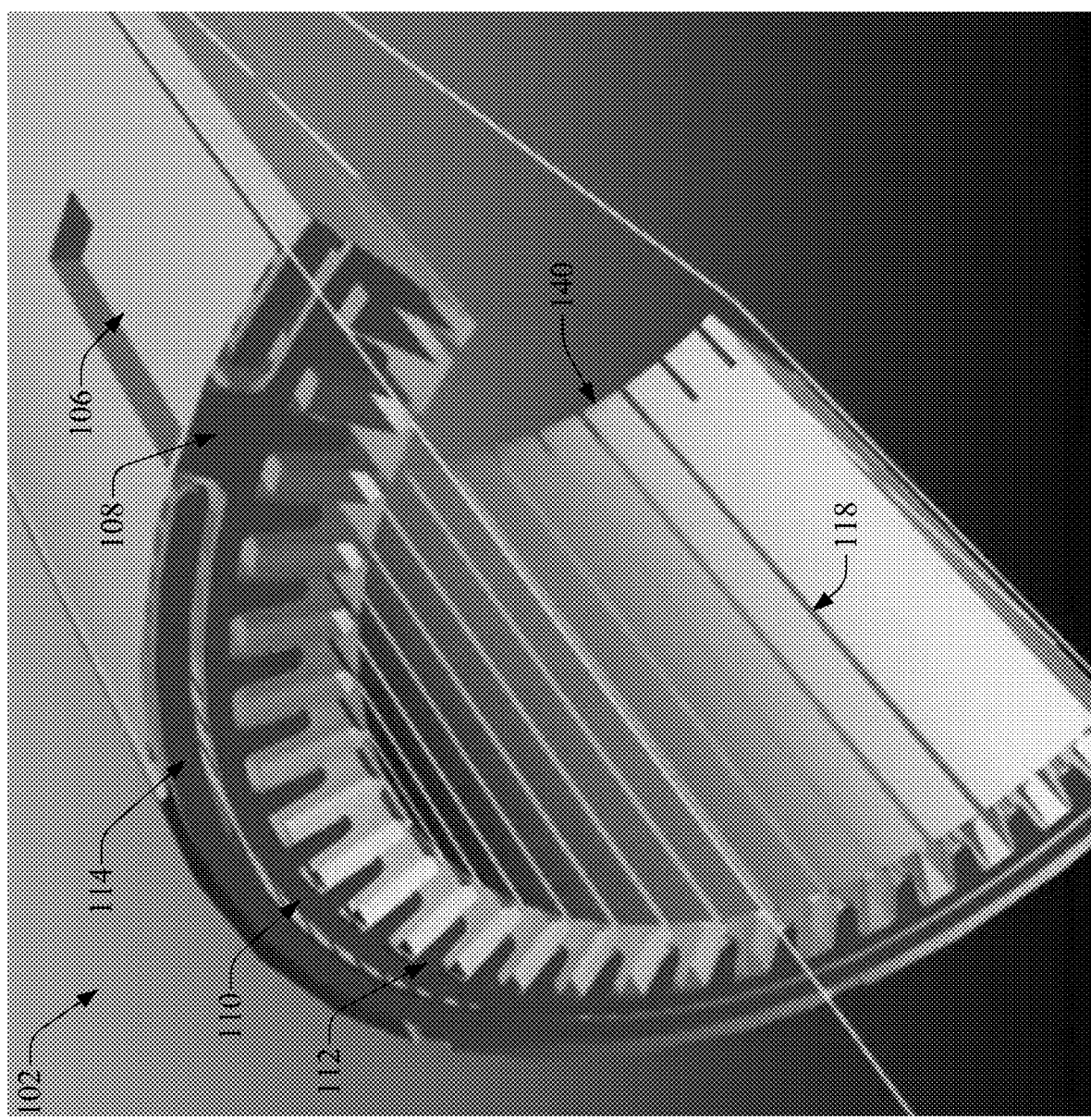
FIG. 9 illustrates a sectioned-perspective-view of an exemplary stator in accordance with one or more embodiments described herein.
Figure 10:
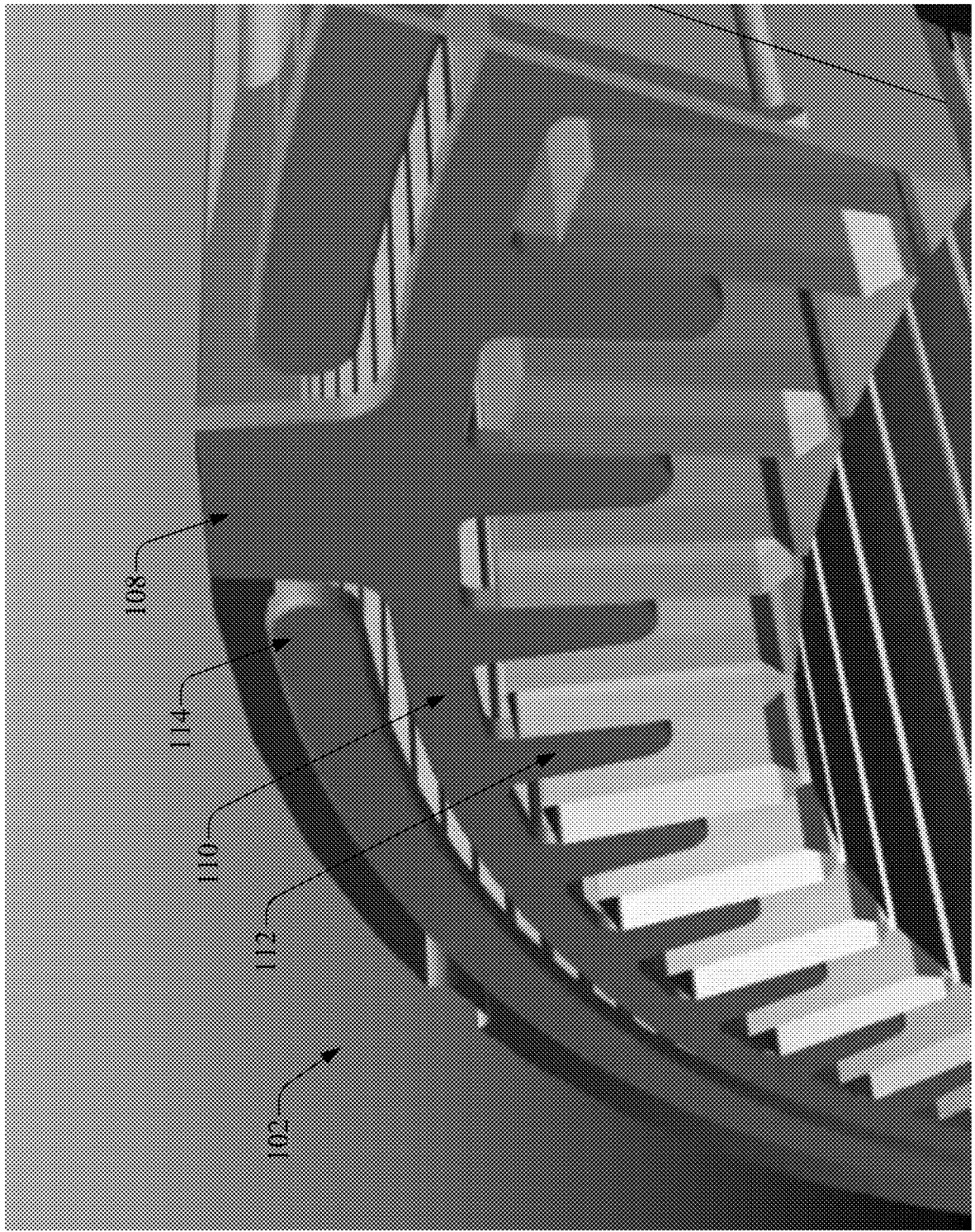
FIG. 10 illustrates a sectioned-perspective-view of an exemplary stator in accordance with one or more embodiments described herein.
Figure 11:
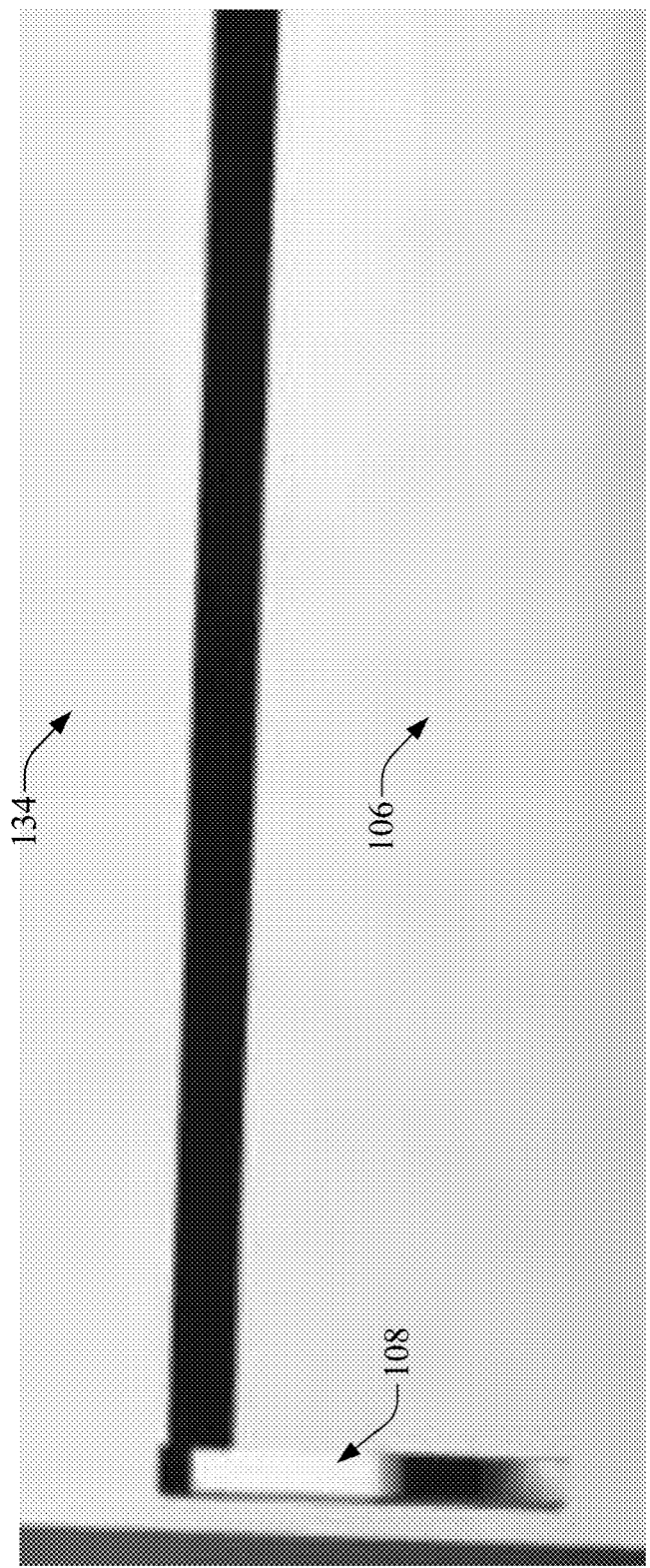
FIG. 11 illustrates a perspective-view of an exemplary stator oil inlet and oil cavity in accordance with one or more embodiments described herein.

Oil returned from an array of outer cooling ducts 120 can flow into a drainage jacket 114. The drainage jacket 114 can be hollow and can enable oil to flow (e.g., down) to an oil drain 116, which can allow oil to flow back into a transmission, oil reservoir (e.g., oil supply 104), or another location before being reintroduced into the oil cavity 106. It is noted that the oil drain 116 can be referred to as an oil outlet and can be located on a bottom-side of the stator. Oil can be cooled while outside the stator 102 before being reintroduced into the stator 102. FIG. 8 illustrates another view of the non-driving-end 130. FIG. 9 illustrates a section view illustrating a perspective of a non-driving-end 130. FIG. 10 illustrates a closer view of the non-driving-end 130. In FIG. 10, relative positions of the inlet jacket 110 and drainage jacket 114 can be observed. In this regard, the inlet jacket 110 is circumferentially located closer to a center axis of the stator 102 than the drainage jacket 114. In this regard, the drainage jacket 114 can be located closer to an exterior surface of the stator 102. FIG. 11 illustrates an overhead view (e.g., from above the stator 102) of the oil inlet 108 and the oil cavity 106. It is noted, in various embodiments, that the oil inlet 108 can be located on a top side of the stator 102.

Figure 12:
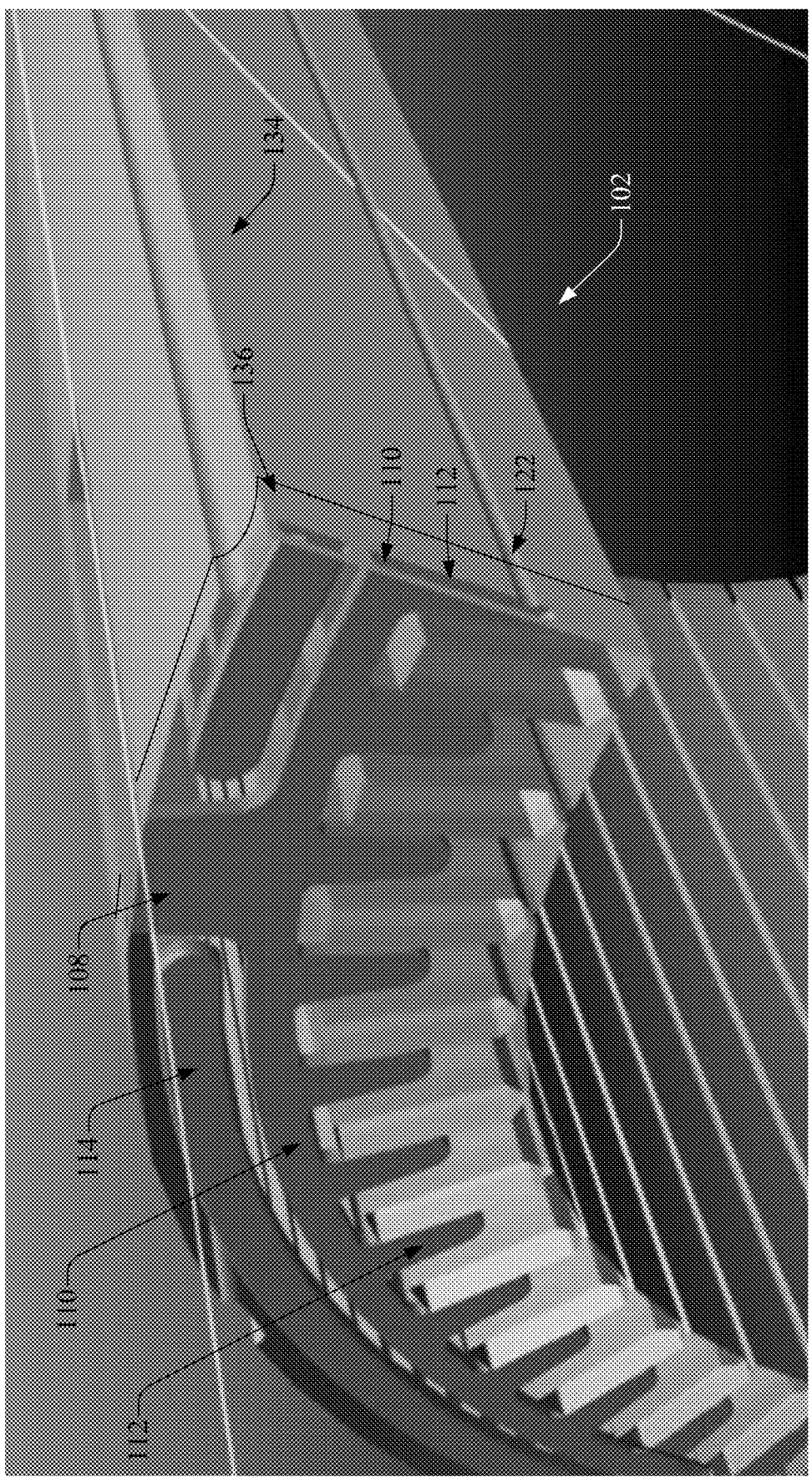
FIG. 12 illustrates a sectioned-perspective-view of an exemplary stator in accordance with one or more embodiments described herein.
Figure 13:
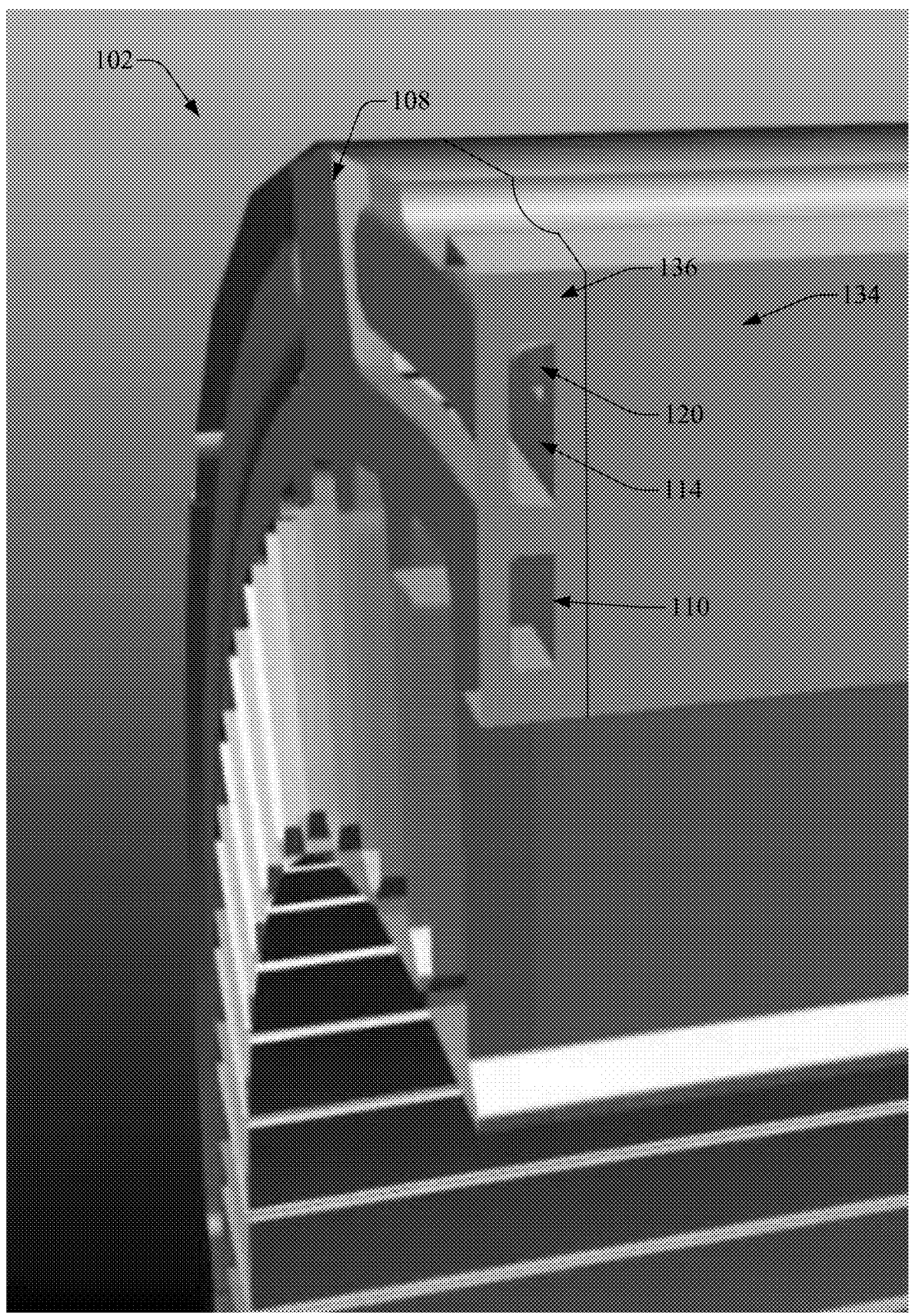
FIG. 13 illustrates a sectioned-perspective-view of an exemplary stator in accordance with one or more embodiments described herein.
Figure 14:
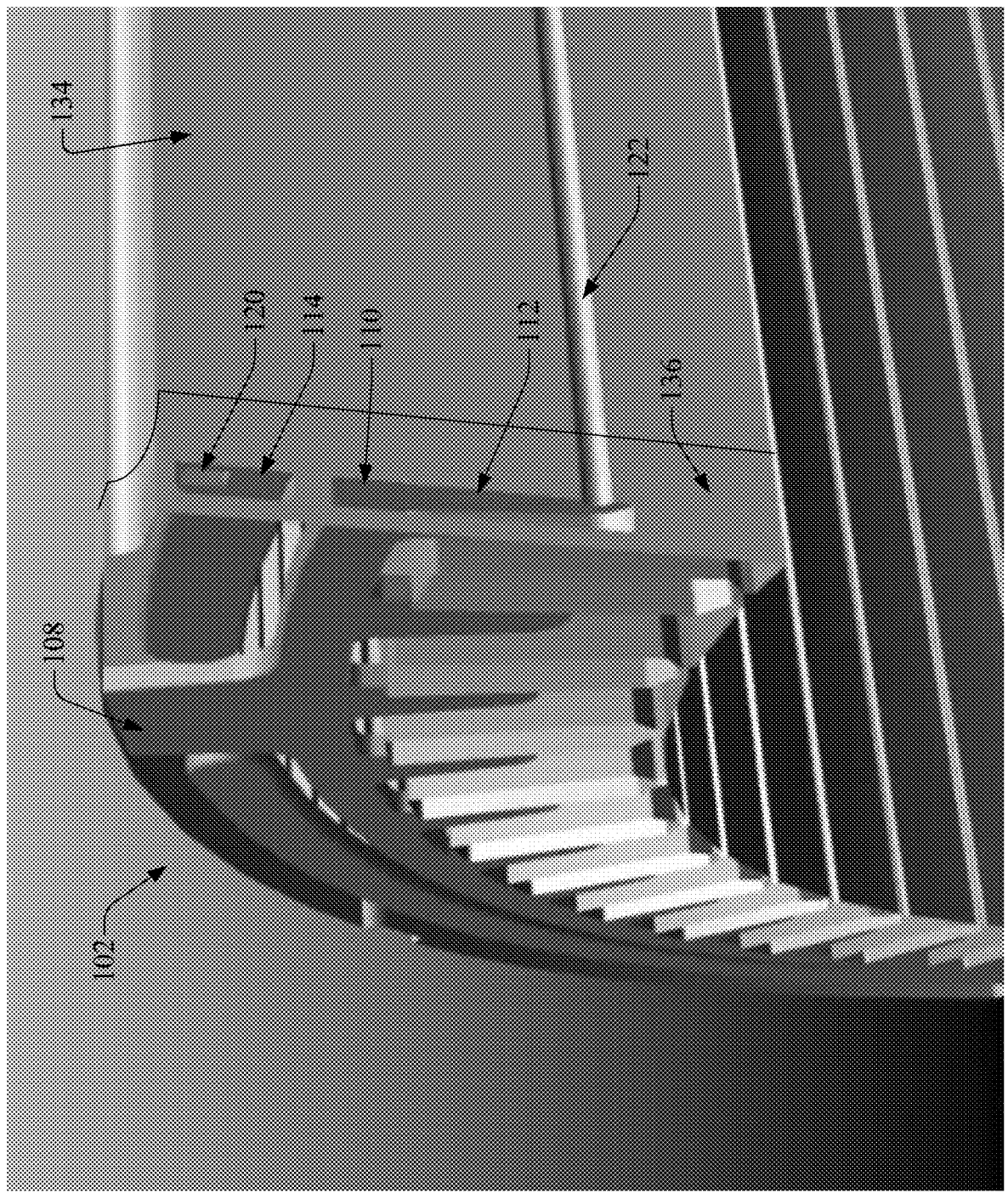
FIG. 14 illustrates a sectioned-perspective-view of an exemplary stator in accordance with one or more embodiments described herein.
Figure 15:
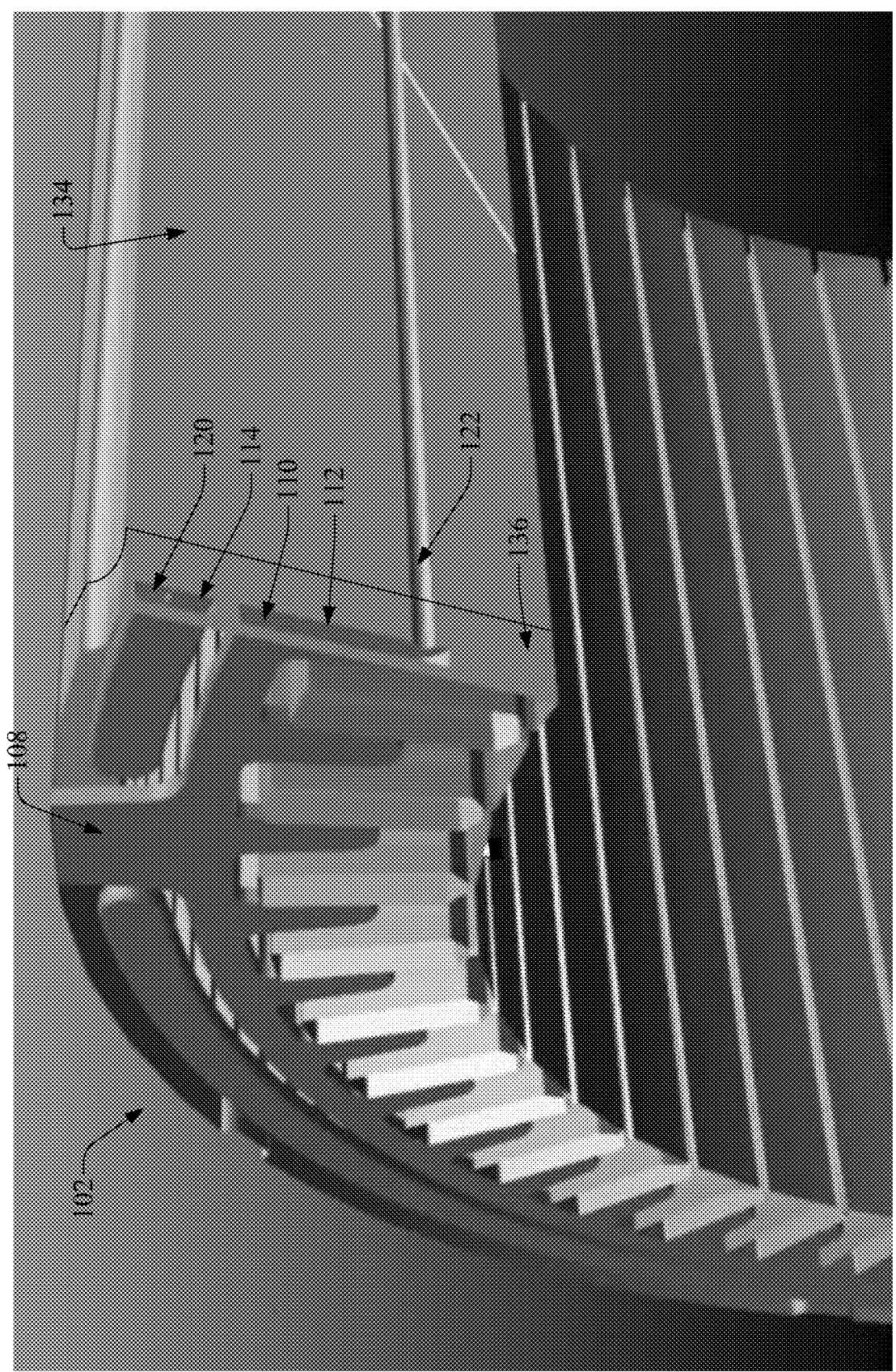
FIG. 15 illustrates a sectioned-perspective-view of an exemplary stator in accordance with one or more embodiments described herein.

Turning now to FIG. 12, there is illustrated a section view of the stator 102. In this view, one of the inner cooling ducts 122 can be visualized. Inner cooling ducts 122 can carry oil which can extract heat from the stator 102 during passage through the inner cooling ducts 122. In this regard, it is noted that the inner cooling ducts 122 can cool copper windings (e.g., a plurality of copper windings 142) of a stator 102 at least due to the close proximity of the inner cooling ducts 122 to the copper windings of the stator 102. As can be observed in FIG. 12, the inner cooling duct can be fluidly connected to one of the inlet fingers 112. According to an embodiment, inlet fingers 112 can be hollow, and fluidly connected to the inlet jacket 110 which is fluidly connected to the oil inlet 108. FIGS. 13-14 illustrate similar perspectives. In FIG. 13, an outer cooling duct 120 can be observed. It is noted that the outer cooling duct 120 can be fluidly connected to the drainage jacket 114. According to an embodiment, the drainage jacket 114 can be hollow and route oil to a bottom side of the stator 102 for exit from the stator 102 via the oil drain 116. In this regard, heat is removed from the stator 102 when heated oil (e.g., from heat radiating from copper windings) exists the stator 102. In FIGS. 14 and 15, an inner cooling duct 122 is also visualized. In FIG. 14, relative positions of the inner cooling ducts 122 and outer cooling ducts 120 can be observed. In this regard, the inner cooling ducts 122 are circumferentially located closer to a center axis of the stator 102 than the outer cooling ducts 120, which are located closer to an exterior surface of the stator 102. It is noted that the array of outer cooling ducts 120 can comprise rectangular ducts and the array of inner cooling ducts 122 can comprise round ducts, though any suitable duct shape and/or combination of duct shapes can be utilized for either of the array of inner cooling ducts 122 and/or array of outer cooling ducts 120.

Figure 17:
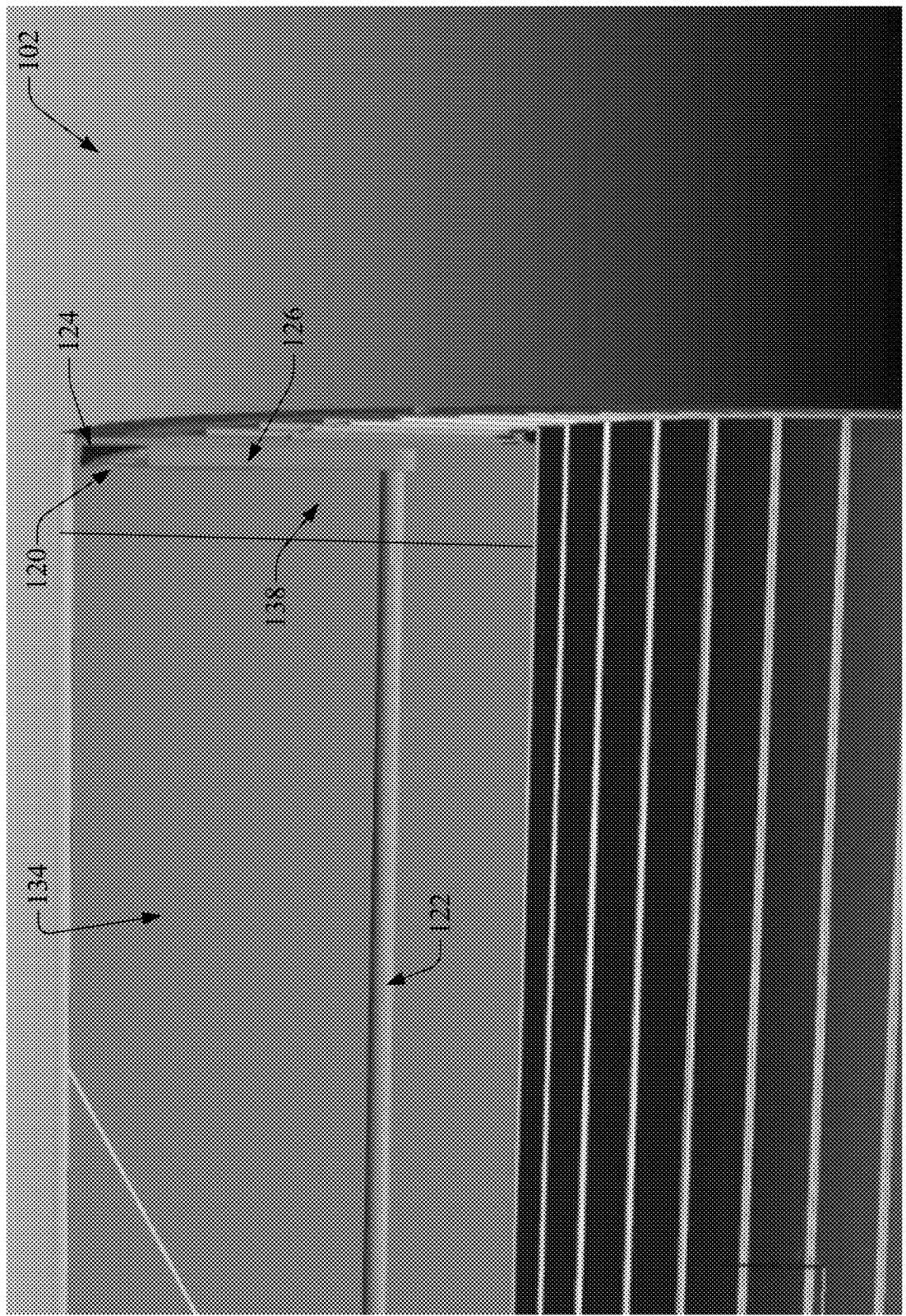
FIG. 17 illustrates a sectioned-perspective-view of an exemplary stator in accordance with one or more embodiments described herein.
Figure 18:
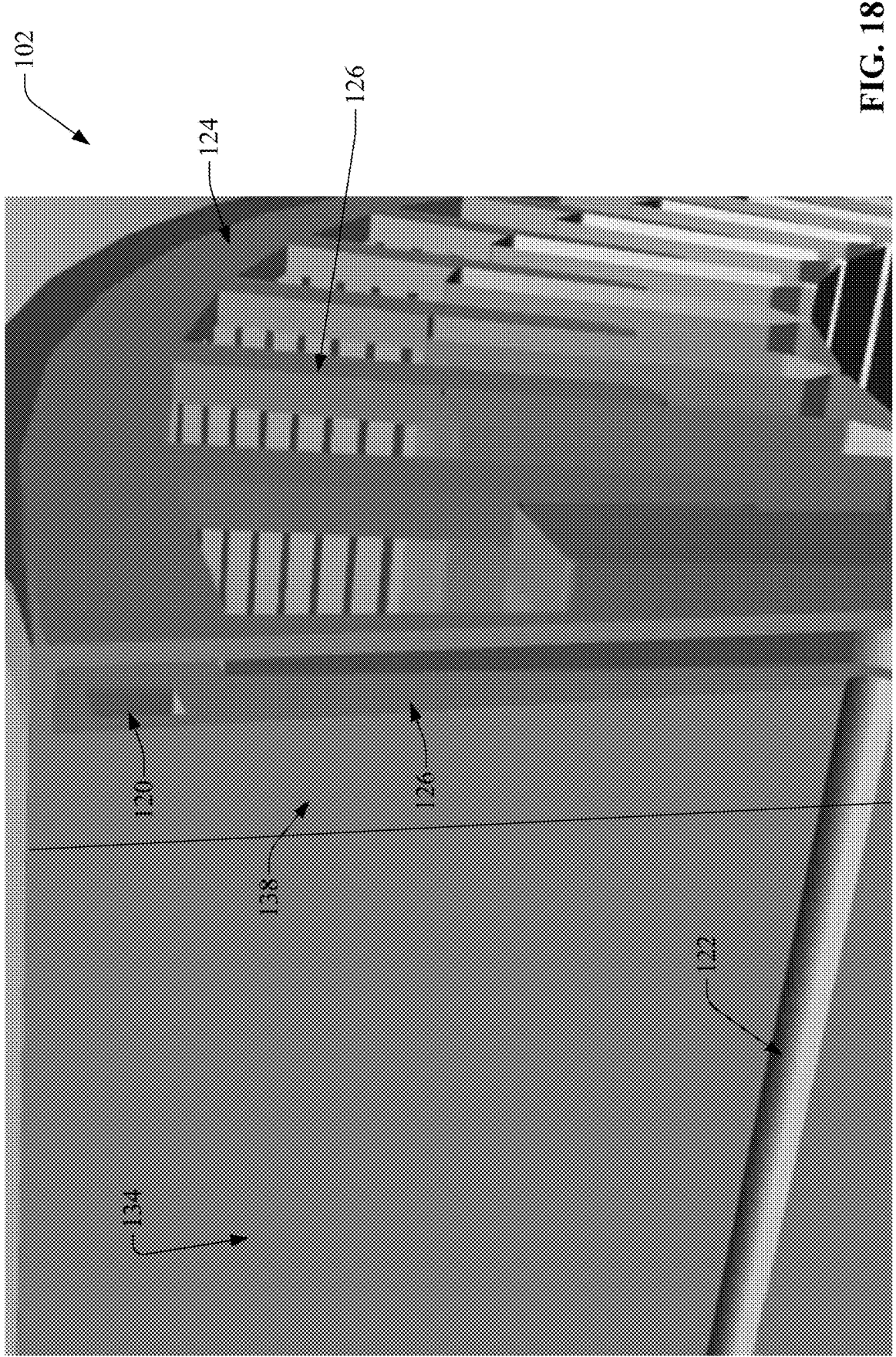
FIG. 18 illustrates a sectioned-perspective-view of an exemplary stator in accordance with one or more embodiments described herein.

With reference to FIG. 16, a section-view of driving-end 132 of a stator 102 is illustrated. FIG. 16 illustrates the outlet jacket 124 and the array of outlet fingers 126. An outlet finger 126 can fluidly connect an end of an inner cooling duct 122 to the outlet jacket 124. According to an embodiment, the array of outer cooling ducts 120 can be fluidly connected to the outlet jacket 124. FIG. 17 illustrates another perspective of the driving-end 132. In FIG. 17, the fluid connection between an inner cooling duct 122, outlet finger 126, outlet jacket 124, and array of outer cooling ducts 120 can be realized. FIG. 18 illustrates a similar perspective of the driving-end 132. In this regard, the array of outlet fingers 126 can be more easily observed in addition to the fluid connection between the array of outlet fingers 126 and the outlet jacket 124.

Figure 19:
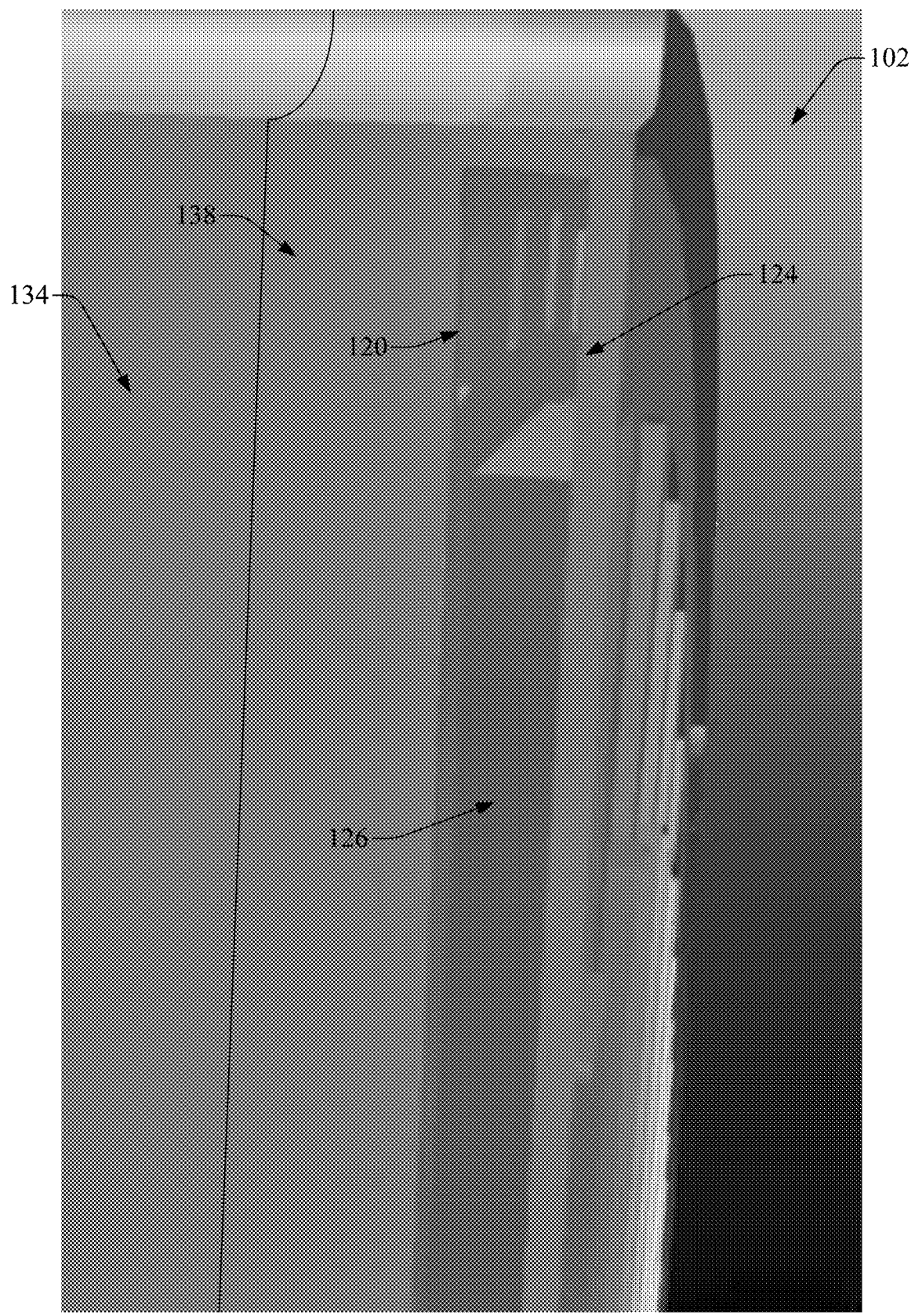
FIG. 19 illustrates a sectioned-perspective-view of an exemplary stator in accordance with one or more embodiments described herein.

FIG. 19 illustrates another section view of the driving-end 132. In this regard, an interior of the outlet jacket 124 can be observed, in addition its fluid connection to a plurality of outer cooling ducts 120.

Figure 20:
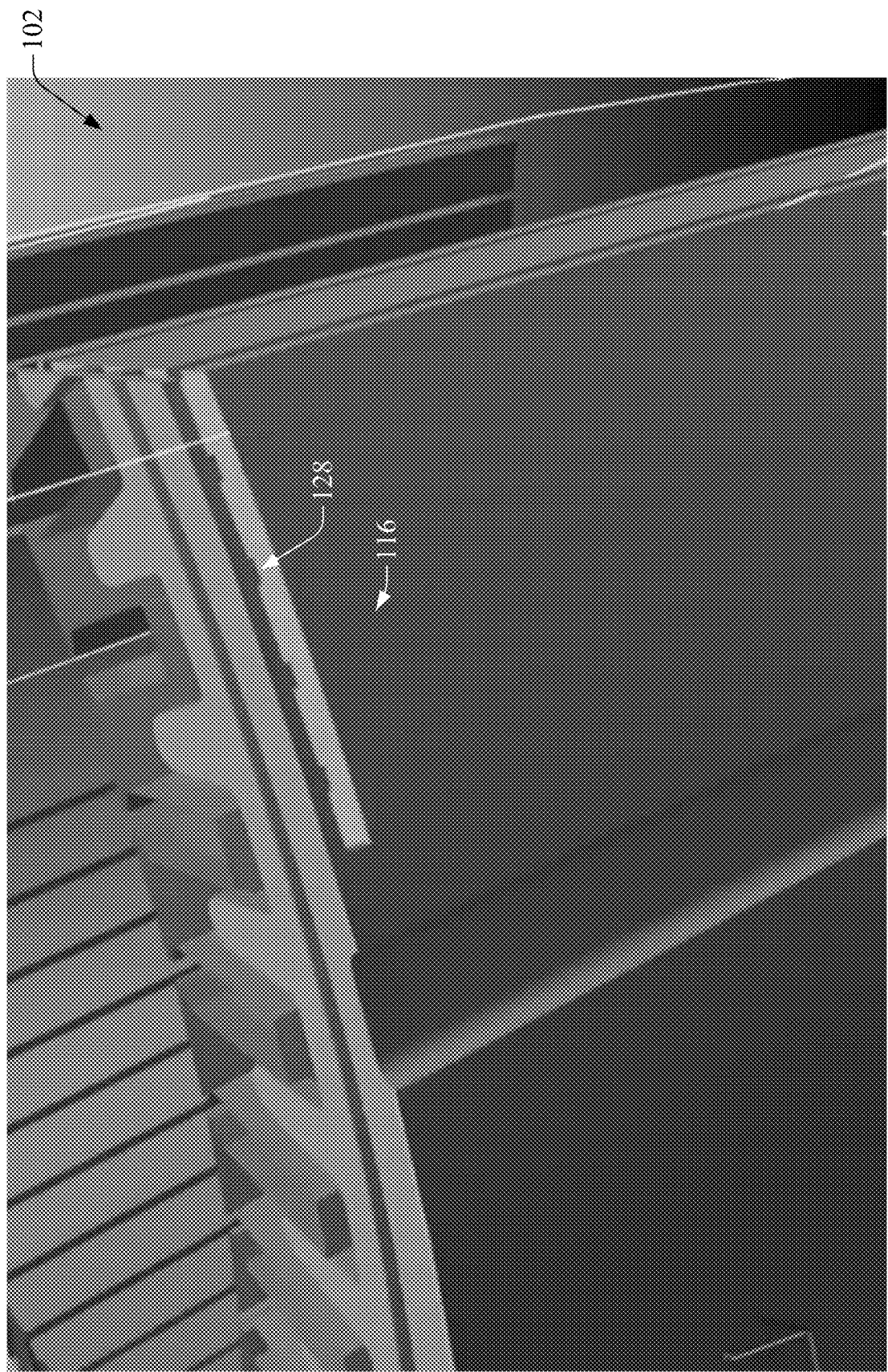
FIG. 20 illustrates a perspective-view of an exemplary stator in accordance with one or more embodiments described herein.

Turning now to FIG. 20, there is illustrated a perspective view of a bottom-side of a stator 102. In FIG. 20, oil drain 116 can be observed. According to an embodiment, the oil drain 116 can comprise one or more drain ducts 128.

Figure 21:
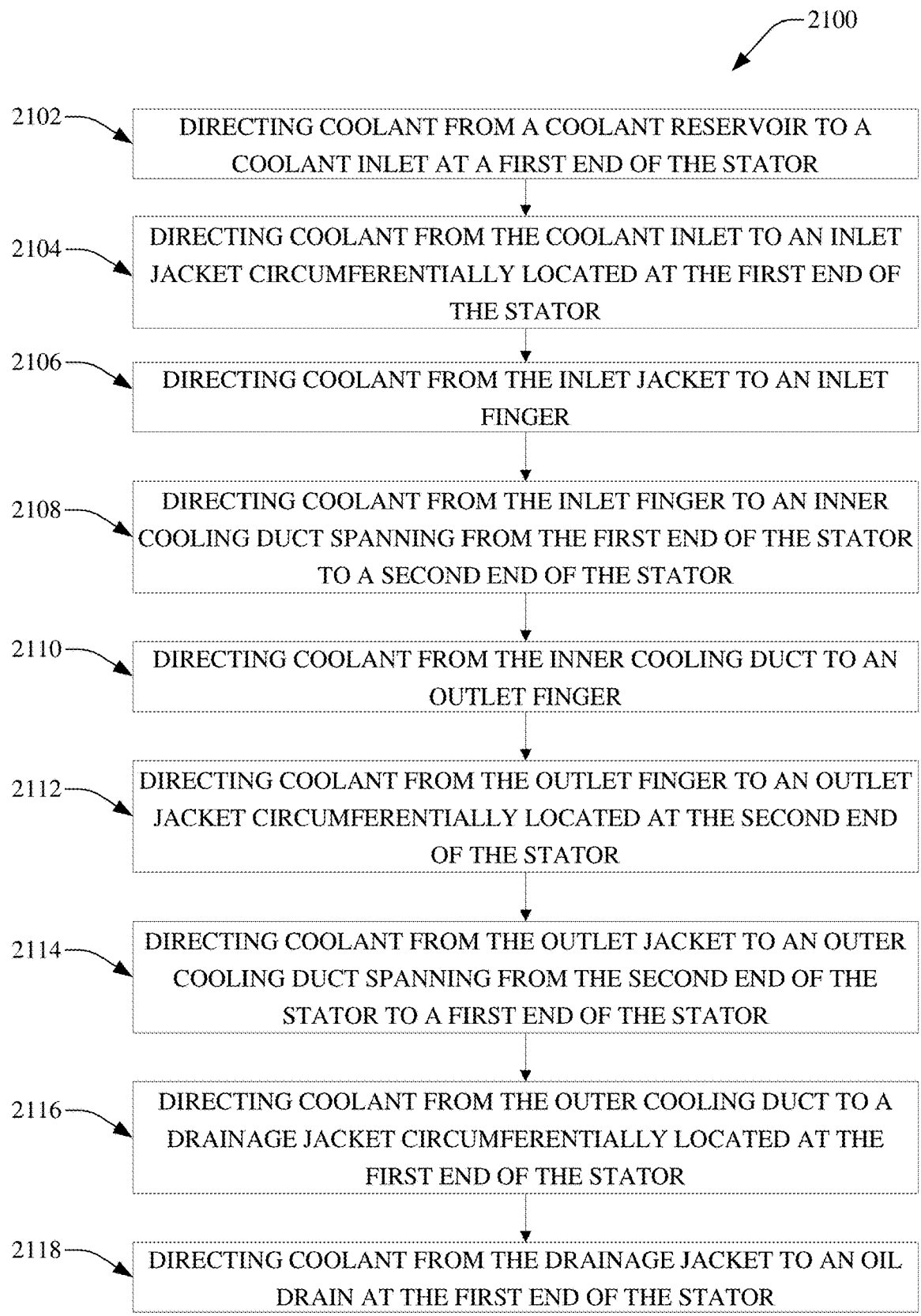
FIG. 21 is a block flow diagram for a process for a method for cooling a stator in accordance with one or more embodiments described herein.

With reference to FIG. 21, a method for cooling a stator is described herein. At 2102, coolant is directed from a coolant reservoir to a coolant inlet at a first end of a stator. At 2104, coolant is directed from the coolant inlet to an inlet jacket circumferentially located at the first end of the stator. At 2106, coolant is directed from the inlet jacket to an inlet finger. At 2108, coolant is directed from the inlet finger to an inner cooling duct spanning from the first end of the stator to a second end of the stator. At 2110, coolant is directed from the inner cooling duct to an outlet finger. At 2112, coolant is directed from the outlet finger to an outlet jacket circumferentially located at the second end of the stator. At 2114, coolant is directed from the outlet jacket to an outer cooling duct spanning from the second end of the stator to a first end of a stator. At 2116, coolant is directed from the outer cooling duct to a drainage jacket circumferentially located at the first end of the stator. At 2118, coolant is directed from the drainage jacket to an oil drain at the first end of the stator.

FIG. 21, as described above, illustrates respective methods or systems in accordance with certain aspects of this disclosure. While, for purposes of simplicity of explanation, the methods or systems are shown and described as a series of acts, it is to be understood and appreciated that this disclosure is not limited by the order of acts, as some acts may occur in different orders and/or concurrently with other acts from those shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A stator, comprising:
   a stator body, comprising:
      an inner cooling duct, and
      an outer cooling duct, wherein the inner cooling duct is located closer to a center axis of the stator body than the outer cooling duct;

a first endplate received at a first end of the stator body, the first endplate comprising:
  an inlet jacket circumferentially located within the first endplate,
  an inlet finger fluidly connected to the inlet jacket, and
  a drainage jacket circumferentially located within the first endplate;
a second endplate received at a second end of the stator body, the second endplate comprising:
  an outlet jacket circumstantially located within the second endplate, and
  an outlet finger fluidly connected to the outlet jacket,
wherein the inner cooling duct fluidly connects the inlet jacket to the outlet finger, and wherein the outer cooling duct fluidly connects to the outlet jacket to the drainage jacket.

2. The stator of any preceding clause, further comprising:
an oil inlet received in the stator body and fluidly connected to the inlet jacket; and
an oil drain received in the stator body and fluidly connected to the drainage jacket.

3. The stator of any preceding clause, wherein the oil inlet and oil drain are fluidly connected to a transmission oiling system.

4. The stator of any preceding clause, wherein the first endplate and the second endplate comprise stamped endplates.

5. The stator of any preceding clause, wherein the inlet finger is one of an array of inlet fingers, and wherein copper windings of the stator are received between each inlet finger of the array of inlet fingers.

6. The stator of any preceding clause, wherein the inner cooling duct is one of an array of inner cooling ducts, and wherein the array of inner cooling ducts is circumferentially located around the stator.

7. The stator of any preceding clause, wherein the outer cooling duct is one of an array of outer cooling ducts, and wherein the array of outer cooling ducts is circumferentially located around the stator.

8. The stator of any preceding clause, wherein the inlet jacket and inlet finger are received in a first endplate of the stator, and wherein the first endplate is removably attached to a stator body of the stator.

9. The stator of any preceding clause, wherein the outlet jacket is received in a second endplate of the stator, and wherein the second endplate is removably attached to a stator body of the stator.

10. The stator of any preceding clause, wherein the inlet jacket and inlet finger are located on a non-driving-end of the stator, and wherein the outlet jacket is located on a driving end of the stator.

11. The stator of clause 1 above with any set of combinations of the stators 2-10 above.

12. A stator assembly, comprising:
a stator body, wherein the stator body comprises:
  an array of inner cooling ducts circumferentially located around the stator body and fluidly connecting a first end of the stator body to a second end of the stator body, and
  an array of outer cooling ducts circumferentially located around the stator body and fluidly connecting the second end of the stator body to the first end of the stator body, wherein the array of outer cooling ducts is located closer to an outer surface of the stator body than the array of inner cooling ducts;
a first stator endplate located at a first end of the stator body, wherein the first stator endplate comprises:
  an inlet jacket circumferentially located at the first end of the stator body, and
  an array of inlet fingers fluidly connected the inlet jacket and fluidly connected to the array of inner cooling ducts; and
a second stator endplate located at a second end of the stator body, wherein the second stator endplate comprises:
  an outlet jacket circumferentially located at the second end of the stator body, and
  an array of outlet fingers fluidly connected to a drainage jacket and fluidly connected to the array of outer cooling ducts.

13. The stator assembly of any preceding clause, further comprising:
an oil inlet received in a top side of the stator body and fluidly connected to the inlet jacket; and
an oil outlet received in a bottom side of the stator body, wherein the bottom side is opposite the top side, and wherein the oil outlet is fluidly connected to the drainage jacket.

14. The stator assembly of any preceding clause, wherein the oil inlet is fluidly connected to an outlet of a transmission oil system, and wherein the oil outlet is fluidly connected to an oil inlet of the transmission oil system.

15. The stator assembly of any preceding clause, wherein the array of outer cooling ducts comprises rectangular ducts.

16. The stator assembly of any preceding clause, wherein the array of inner cooling ducts comprises cylindrical ducts.

17. The stator assembly of any preceding clause, wherein the stator body further comprises:
an array of copper windings received between fingers of the array of inlet fingers and fingers of the array of outlet fingers.

18. The stator assembly of any preceding clause, wherein the first stator endplate and second stator endplate are each formed by a stamping process.

19. The stator assembly of clause 12 above with any set of combinations of the stators 13-18 above.

20. A method for cooling a stator, comprising:
directing coolant from a coolant reservoir to a coolant inlet at a first end of the stator;
directing coolant from the coolant inlet to an inlet jacket circumferentially located at the first end of the stator;
directing coolant from the inlet jacket to an inlet finger;
directing coolant from the inlet finger to an inner cooling duct spanning from the first end of the stator to a second end of the stator;
directing coolant from the inner cooling duct to an outlet finger;
directing coolant from the outlet finger to an outlet jacket circumferentially located at the second end of the stator;
directing coolant from the outlet jacket to an outer cooling duct spanning from the second end of the stator to a first end of the stator;
directing coolant from the outer cooling duct to a drainage jacket circumferentially located at the first end of the stator; and
directing coolant from the drainage jacket to an oil drain at the first end of the stator.

21. The method of any preceding clause, wherein the coolant comprises transmission fluid.

22. The method of any preceding clause, wherein directing coolant through the inner cooling duct cools a copper winding of the stator.

23. The method of clause 20 above with any set of combinations of the stators 21-22 above.

What is claimed is:

1. A stator, comprising:
a stator body, comprising:
an inner cooling duct parallel to a center axis of the stator body, and
an outer cooling duct parallel to the center axis of the stator body, wherein the inner cooling duct is located closer to the center axis of the stator body than the outer cooling duct;
a first endplate received at a first end of the stator body, the first endplate comprising:
an inlet jacket having a first circumferential path located within the first endplate,
an array of inlet fingers fluidly connected to the inlet jacket, wherein the first circumferential path is normal to the center axis of the stator body and is fluidly connected to the array of inlet fingers, and
a drainage jacket having a second circumferential path located within the first endplate, wherein the second circumferential path is normal to the center axis of the stator body;
a second endplate received at a second end of the stator body, the second endplate comprising:
an outlet jacket having a third circumferential path located within the second endplate, and
an array of outlet fingers fluidly connected to the outlet jacket, wherein the third circumferential path is normal to the center axis of the stator body and is fluidly connected to the array of outlet fingers;
wherein the inner cooling duct fluidly connects the inlet jacket to the outlet fingers, and wherein the outer cooling duct fluidly connects the outlet jacket to the drainage jacket.

2. The stator of claim 1, further comprising:
an oil inlet received in the stator body and fluidly connected to the inlet jacket; and
an oil drain received in the stator body and fluidly connected to the drainage jacket.

3. The stator of claim 2, wherein the oil inlet and the oil drain are fluidly connected to a transmission oiling system.

4. The stator of claim 1, wherein the first endplate and the second endplate comprise stamped endplates.

5. The stator of claim 1, wherein copper windings of the stator are received between each inlet finger of the array of inlet fingers.

6. The stator of claim 1, wherein the inner cooling duct is one of an array of inner cooling ducts, and wherein the array of inner cooling ducts is circumferentially located around the stator.

7. The stator of claim 1, wherein the outer cooling duct is one of an array of outer cooling ducts, and wherein the array of outer cooling ducts is circumferentially located around the stator.

8. The stator of claim 1, wherein the first endplate is removably attached to the stator body of the stator.

9. The stator of claim 1, wherein the second endplate is removably attached to the stator body of the stator.

10. The stator of claim 1, wherein the inlet jacket and inlet fingers are located on a non-driving-end of the stator, and wherein the outlet jacket is located on a driving end of the stator.

11. A stator assembly, comprising:
a stator body, wherein the stator body comprises:
an array of inner cooling ducts parallel to a center axis of the stator body, circumferentially located around the stator body, and fluidly connecting a first end of the stator body to a second end of the stator body, and
an array of outer cooling ducts parallel to the center axis of the stator body, circumferentially located around the stator body, and fluidly connecting the second end of the stator body to the first end of the stator body, wherein the array of outer cooling ducts is located closer to an outer surface of the stator body than the array of inner cooling ducts;
a first stator endplate located at the first end of the stator body, wherein the first stator endplate comprises:
an inlet jacket having a first circumferential path located at the first end of the stator body, and
an array of inlet fingers fluidly connected to the inlet jacket and fluidly connected to the array of inner cooling ducts, wherein the first circumferential path is normal to the center axis of the stator body and is fluidly connected to the array of inlet fingers; and
a second stator endplate located at the second end of the stator body, wherein the second stator endplate comprises:
an outlet jacket having a second circumferential path located at the second end of the stator body, wherein the second circumferential path is normal to the center axis of the stator body, and
an array of outlet fingers fluidly connected to a drainage jacket having a third circumferential path located within the first stator endplate, and fluidly connected to the array of outer cooling ducts, wherein the third circumferential path is normal to the center axis of the stator body and is fluidly connected to the array of outlet fingers.

12. The stator assembly of claim 11, further comprising:
an oil inlet received in a top side of the stator body and fluidly connected to the inlet jacket; and
an oil outlet received in a bottom side of the stator body, wherein the bottom side is opposite the top side, and wherein the oil outlet is fluidly connected to the drainage jacket.

13. The stator assembly of claim 12, wherein the oil inlet is fluidly connected to an outlet of a transmission oil system, and wherein the oil outlet is fluidly connected to an oil inlet of the transmission oil system.

14. The stator assembly of claim 11, wherein the array of outer cooling ducts comprises rectangular ducts.

15. The stator assembly of claim 11, wherein the array of inner cooling ducts comprises cylindrical ducts.

16. The stator assembly of claim 11, wherein the stator body further comprises:
an array of copper windings received between fingers of the array of inlet fingers and fingers of the array of outlet fingers.

17. The stator assembly of claim 11, wherein the first stator endplate and the second stator endplate are each formed by a stamping process.

18. A method for cooling a stator, comprising:
directing coolant from a coolant reservoir to a coolant inlet at a first end of the stator;

directing at least some of the coolant from the coolant inlet to an inlet jacket having a first circumferential path located at the first end of the stator;

directing at least some of the coolant from the inlet jacket to an array of inlet fingers, wherein the first circumferential path is normal to a center axis of the stator and is fluidly connected to the array of inlet fingers;

directing at least some of the coolant from the inlet fingers to an inner cooling duct spanning from the first end of the stator to a second end of the stator, wherein the inner cooling duct is parallel to the center axis of the stator;

directing at least some of the coolant from the inner cooling duct to an array of outlet fingers;

directing at least some of the coolant from the outlet fingers to an outlet jacket having a second circumferential path located at the second end of the stator, wherein the second circumferential path is normal to the center axis of the stator;

directing at least some of the coolant from the outlet jacket to an outer cooling duct spanning from the second end of the stator to the first end of the stator, wherein the outer cooling duct is parallel to the center axis of the stator;

directing at least some of the coolant from the outer cooling duct to a drainage jacket having a third circumferential path located at the first end of the stator, wherein the third circumferential path is normal to the center axis of the stator and is fluidly connected to the array of outlet fingers; and directing at least some of the coolant from the drainage jacket to an oil drain at the first end of the stator.

19. The method of claim 18, wherein the coolant comprises transmission fluid.

20. The method of claim 18, wherein the directing at least some of the coolant through the inner cooling duct cools a copper winding of the stator.

* * * * *